(12) United States Patent
Wilkinson et al.

(10) Patent No.: US 8,707,397 B1
(45) Date of Patent: Apr. 22, 2014

(54) ACCESS CONTROL CENTER AUTO LAUNCH

(75) Inventors: Christopher Thomas Wilkinson, San Antonio, TX (US); Edward Allen Francovich, Helotes, TX (US); Jeremy Ryan Scott, San Antonio, TX (US); Steven Dale Sternitzke, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 783 days.

(21) Appl. No.: 12/208,323

(22) Filed: Sep. 10, 2008

(51) Int. Cl.
*G06F 21/00* (2013.01)
*G06F 9/44* (2006.01)
*G06F 9/46* (2006.01)
*G06F 11/07* (2006.01)
*H04L 29/06* (2006.01)

(52) U.S. Cl.
CPC .............. *G06F 9/4445* (2013.01); *G06F 9/465* (2013.01); *G06F 11/0748* (2013.01); *H04L 63/0892* (2013.01)
USPC ................................. 726/4; 726/12; 709/203

(58) Field of Classification Search
CPC ... G06F 9/4445; G06F 9/465; G06F 11/0748; H04L 63/0892
USPC .............. 726/4, 12; 705/26.41, 26.4; 709/203
See application file for complete search history.

(56) References Cited

U.S. PATENT DOCUMENTS

| 5,968,176 | A | 10/1999 | Nessett et al. |
| 5,970,149 | A | 10/1999 | Johnson et al. |
| 6,205,579 | B1 * | 3/2001 | Southgate ..................... 717/173 |
| 6,289,378 | B1 | 9/2001 | Meyer et al. |
| 6,356,934 | B1 | 3/2002 | Delph |
| 6,389,426 | B1 | 5/2002 | Turnbull et al. |
| 6,463,459 | B1 | 10/2002 | Orr et al. |
| 6,554,619 | B2 | 4/2003 | Williams |
| 6,611,822 | B1 | 8/2003 | Beams et al. |
| 6,754,707 | B2 | 6/2004 | Richards et al. |
| 6,799,213 | B1 | 9/2004 | Zhao et al. |
| 6,999,990 | B1 * | 2/2006 | Sullivan et al. ............... 709/205 |
| 7,117,529 | B1 * | 10/2006 | O'Donnell et al. ............... 726/6 |

(Continued)

OTHER PUBLICATIONS

Centrify. "Using PuTTY for Kerberos-Based Authentication to UNIX and Linux Systems." Centrify Corporation. [retrieved from the Internet on Oct. 1, 2008 using <URL: http://www.centrify.com/resources/putty.asp>].

(Continued)

*Primary Examiner* — Jung Kim
*Assistant Examiner* — Thomas Ho
(74) *Attorney, Agent, or Firm* — Eric L. Sophir; Dentons US LLP

(57) ABSTRACT

Methods and systems provide indirect and temporary access to a company's IT infrastructure and business applications. The methods/systems involve establishing an access control center (ACC) to control the access that technical support personnel may have to the company's IT infrastructure and business applications. Thin client terminals with limited functionality may then be set up in the ACC for use by the technical support personnel. The thin client terminals connect the technical support personnel to workstations outside the ACC that operate as virtual desktops. The virtual desktops in turn connect the technical support personnel to the IT infrastructure and business applications. An ACC application may be used to automatically establish the connection between the thin client terminals and the virtual desktops and the virtual desktops and the IT infrastructure and business applications.

21 Claims, 16 Drawing Sheets

(56) References Cited

U.S. PATENT DOCUMENTS

| | | | |
|---|---|---|---|
| 7,159,237 B2 | 1/2007 | Schneier et al. | |
| 7,194,690 B2 * | 3/2007 | Guillermo et al. | 715/736 |
| 7,529,931 B2 | 5/2009 | Vasishth et al. | |
| 7,587,588 B2 | 9/2009 | Clemmons et al. | |
| 7,590,761 B2 | 9/2009 | Raphael et al. | |
| 7,630,914 B2 | 12/2009 | Veeningen et al. | |
| 7,702,409 B2 | 4/2010 | Lucas et al. | |
| 7,730,157 B2 | 6/2010 | Baratto et al. | |
| 7,850,071 B2 | 12/2010 | Sakamoto et al. | |
| 7,865,959 B1 | 1/2011 | Lewis | |
| 7,984,483 B2 * | 7/2011 | Leitz et al. | 726/2 |
| 8,255,870 B2 * | 8/2012 | Banino et al. | 717/105 |
| 2002/0087882 A1 | 7/2002 | Schneier et al. | |
| 2002/0112186 A1 | 8/2002 | Ford et al. | |
| 2003/0055804 A1 | 3/2003 | LaButte et al. | |
| 2004/0081951 A1 | 4/2004 | Vigue et al. | |
| 2004/0139075 A1 | 7/2004 | Brodersen et al. | |
| 2004/0181443 A1 | 9/2004 | Horton et al. | |
| 2005/0080897 A1 | 4/2005 | Braun et al. | |
| 2005/0103491 A1 | 5/2005 | Newman et al. | |
| 2005/0125675 A1 | 6/2005 | Weseloh | |
| 2006/0031476 A1 | 2/2006 | Mathes et al. | |
| 2006/0070077 A1 | 3/2006 | Erlandson et al. | |
| 2006/0200477 A1 | 9/2006 | Barrenechea | |
| 2006/0265386 A1 | 11/2006 | Richter | |
| 2006/0293934 A1 | 12/2006 | Tsyganskiy et al. | |
| 2007/0061460 A1 | 3/2007 | Khan et al. | |
| 2007/0143837 A1 | 6/2007 | Azeez et al. | |
| 2007/0150940 A1 | 6/2007 | Gilek et al. | |
| 2007/0162973 A1 | 7/2007 | Schneier et al. | |
| 2007/0174693 A1 | 7/2007 | Gerber | |
| 2007/0198656 A1 | 8/2007 | Mazzaferri et al. | |
| 2007/0250833 A1 | 10/2007 | Araujo et al. | |
| 2007/0283012 A1 | 12/2007 | Chu et al. | |
| 2008/0033882 A1 | 2/2008 | Kafkarkou et al. | |
| 2008/0086345 A1 | 4/2008 | Wilson et al. | |
| 2008/0098466 A1 | 4/2008 | Yoshida et al. | |
| 2008/0228692 A1 | 9/2008 | Wannemacher et al. | |
| 2008/0235361 A1 | 9/2008 | Crosbie et al. | |
| 2008/0271020 A1 | 10/2008 | Leitz et al. | |
| 2009/0018890 A1 | 1/2009 | Werth et al. | |
| 2009/0019436 A1 | 1/2009 | Hartz et al. | |
| 2009/0138510 A1 | 5/2009 | Childress et al. | |
| 2009/0217177 A1 | 8/2009 | DeGrazia | |
| 2009/0276771 A1 | 11/2009 | Nickolov et al. | |

OTHER PUBLICATIONS

Brown, M. "System Administration Toolkit: Set up remote access in UNIX through OpenSSH." IBM, published Feb. 13, 2007. [retrieved from the Internet on Oct. 1, 2008 using <URL: http://www.ibm.com/developerworks/aix/library/au-satopenssh.html>].

eGuard. "eGuard Technology Services." eGuard Tech—Services—Proactive Managed IT Support. [retrieved from the Internet on Oct. 1, 2008 using <URL: http://www.eguardtech.com/Computer%20Consulting%20Services.html>].

"Identify, understand and manage security information and events," IBM Corporation, Apr. 2007, pp. 1-6.

Yurcik, William, et al. "UCLog+ : A Security Data Management System for Correlating Alerts, Incidents, and Raw Data From Remore Logs", University of Illinois at Urbana-Champaign, 10 pgs., date accessed Oct. 14, 2008.

* cited by examiner

ACCESS CONTROL CENTER AUTO LAUNCH

CROSS-REFERENCE TO RELATED APPLICATIONS

This application is related in subject matter to, and incorporates herein by reference in its entirety, each of the following: U.S. patent application entitled "Access Control Center Auto Launch," Ser. No. 12/208,325 (Applicant Reference No. US-0504.02), filed on the same date as this application, and U.S. patent application entitled "Access Control Center Auto Launch," Ser. No. 12/208,327 (Applicant Reference No. US-0504.03), also filed on the same date as this application.

This application is also related in subject matter to, and incorporates herein by reference in their entirety, U.S. patent application Ser. Nos. 12/178,564 (Applicant Reference No. US-0503.01), 12/178,566, (Applicant Reference No. US-0503.02) and 12/178,569 (Applicant Reference No. US-0503.03), each of which is entitled "Access Control Center Workflow and Approval," and each of which was filed Jul. 23, 2008.

This application is further related in subject matter to, and incorporates herein by reference in their entirety, U.S. patent application Ser. Nos. 12/180,480 (Applicant Reference No. US-0506.01) and 12/180,482 (Applicant Reference No. US-0506.02), each of which is entitled "Database for Access Control Center," and each of which was filed Jul. 25, 2008.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to computer and data security and, more specifically, to systems and methods for providing access to computers and data in a secure manner.

BACKGROUND

Companies often engage the services of third-party contractors to fill their IT (information technology) and technical support needs. This use of outside technical support personnel may be necessitated by a number of reasons, including restrictions on new hires within a company, a specific efficiency or technical expertise of the outside personnel, inconvenient or undesirable working hours (e.g., evening or holiday shifts), and the like.

To perform their services, however, the outside technical support personnel must have access to the company's IT infrastructure and business applications, including computer systems, networks, programs, and the like. Unfortunately, granting outside technical support personnel access to a company's IT infrastructure and business applications can create a number of risks, such as lost and/or stolen data, unauthorized access to critical and/or highly sensitive systems, and the like. Indeed, many of the same risks may exist to some degree even with the company's own internal technical support personnel.

Accordingly, what is needed is a way to minimize or eliminate the risks associated with allowing access to a company's IT infrastructure and business applications. More specifically, what is needed is a way to provide controlled or limited access to the company's IT infrastructure and business applications, and to provide such access on an as-needed basis.

SUMMARY

The disclosed embodiments are directed to methods and systems for providing controlled or limited access to a company's IT infrastructure and business applications on an as-needed basis. In one implementation, an access control center (ACC) may be established for restricting the access by technical support personnel to the company's IT infrastructure and business applications. Thin client terminals with limited functionality may then be set up in the ACC for use by the technical support personnel. The thin client terminals may be selectively connected to workstations outside the ACC that operate as virtual desktops. The virtual desktops may provide the technical support personnel with indirect and temporary access to the company's IT infrastructure and business applications. An ACC application may be used to automatically establish the connection between the thin client terminals and the virtual desktops and the virtual desktops and the IT infrastructure and business applications. Such an arrangement minimizes or eliminates the risks associated with allowing technical support personnel access to the company's IT infrastructure and business applications.

BRIEF DESCRIPTION OF THE DRAWINGS

The foregoing and other advantages of the disclosed embodiments will become apparent from the following detailed description and upon reference to the drawings, wherein:

FIG. 12 illustrates an exemplary incident assignment screen according to the disclosed embodiments;

FIG. 13 illustrates an exemplary pending requests screen according to the disclosed embodiments;

FIG. 14 illustrates an exemplary active sessions screen according to the disclosed embodiments;

DETAILED DESCRIPTION

Figure 1:
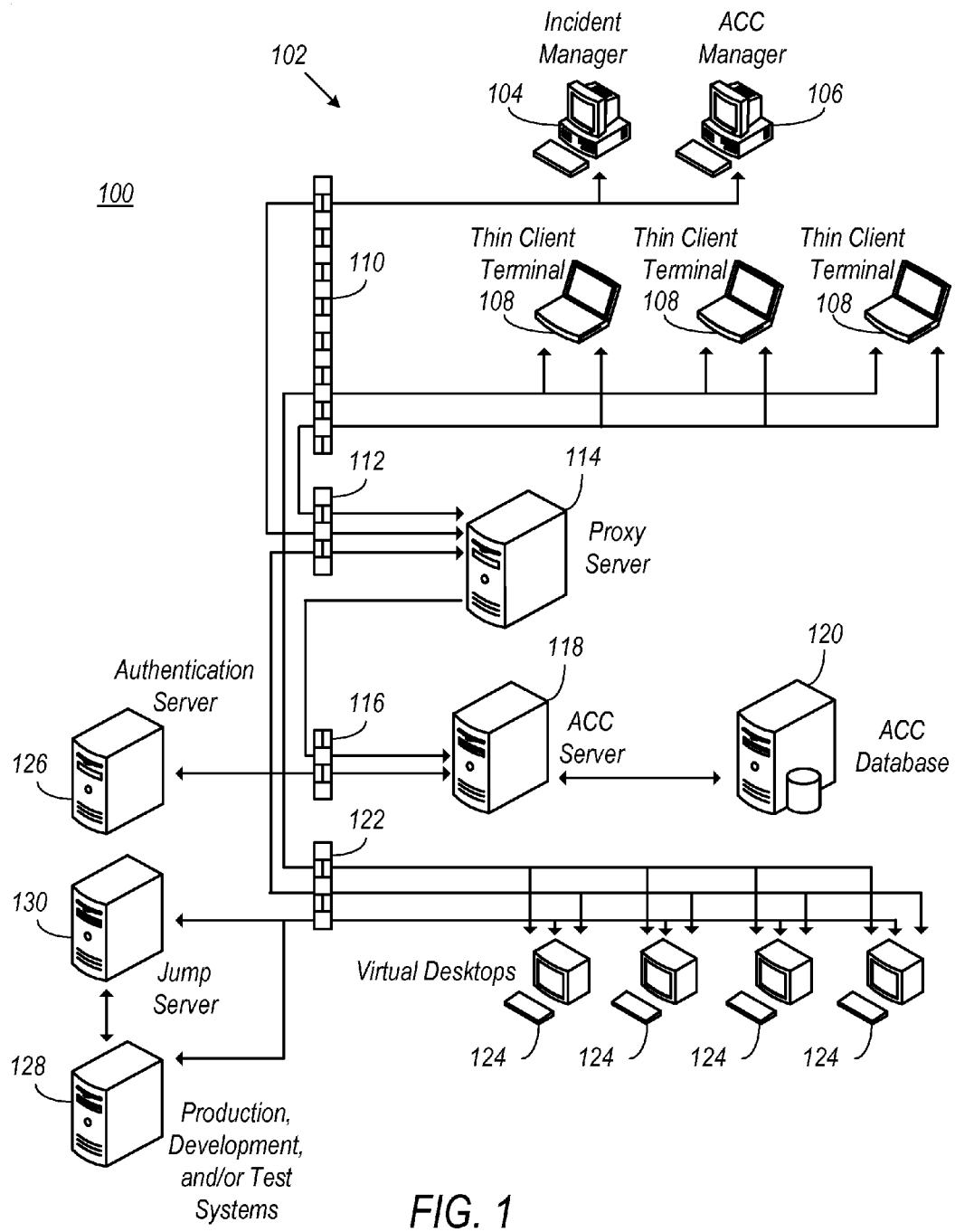
FIG. 1 illustrates an exemplary access control infrastructure including an access control center (ACC) for controlling access to a company's IT infrastructure and business applications according to the disclosed embodiments.

The drawings described above and the written description of specific structures and functions below are not presented to limit the scope of what has been invented or the scope of the appended claims. Rather, the drawings and written description are provided to teach any person skilled in the art to make and use the innovations for which patent protection is sought. Those skilled in the art will appreciate that not all features of a commercial embodiment of the innovations are described or shown for the sake of clarity and understanding.

Persons of skill in this art will also appreciate that the development of an actual commercial embodiment incorporating aspects of the innovations will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the innovation or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Turning now to FIG. 1, an exemplary infrastructure 100 is shown that is capable of being used to control access to a company's IT infrastructure and business applications, including computer systems, networks, and software programs. As alluded to above, it is often necessary for a company to provide access to such systems, networks, and programs to third-party technical support personnel. The infrastructure 100 may be used to limit or control this access by granting to the third-party technical support personnel only indirect and temporary access to the computer systems, networks, and software applications. Indeed, where applicable, the infrastructure 100 may also be used to limit access by the company's own internal technical support personnel. Accordingly, all third-party as well as internal company technical support personnel are henceforth referred to herein simply as "technical support personnel."

In some embodiments, the exemplary access control infrastructure 100 may include an area called an access control center (ACC) 102 from which access to the company's IT infrastructure and business applications may be controlled. Such an ACC 102 may be, for example, a secure room or other enclosed area within the company where the technical support personnel may enter in order to access to the company's IT infrastructure and business applications. Physical entry to the ACC 102 may then be restricted using available security measures, including badges, key cards, bio scans, and the like. However, such physical security measures may not be needed if the identities of the technical support personnel are verifiable in other ways, for example, through user IDs, passwords, access codes, and the like. These latter forms of verification are particularly useful when the ACC 102 is located at a remote or offsite location, for example, another city, state, or country, where it may be difficult for the company to implement and maintain control over physical security measures.

Within the ACC 102, a plurality of computing terminals may be provided, including one or more incident manager terminals 104, ACC manager terminals 106, and thin client terminals 108. The term "incident" is used herein to refer to any IT event or condition, unexpected or otherwise, that may adversely impact an important operation of the company and therefore requires immediate resolution by the technical support personnel. Such an incident typically includes major malfunctions, for example, a suddenly slow or unresponsive Web site, dropped network connections, loss of access to databases, and the like. However, an incident may also include minor operational glitches, updates, and rollouts that, while not requiring immediate resolution, still need to be attended to at some point. Thus, as used herein, an "incident" may include any IT event or condition, whether major or minor, that requires the attention of the technical support personnel.

Referring first to the incident manager terminals 104, these terminals may be used by authorized individuals referred to herein as "incident managers" to manage the technical support personnel of the ACC 102. The incident managers generally are responsible for receiving notice of an incident, gathering any information needed about the incident, then assigning the appropriate technical support personnel to work on the incident. To this end, the incident manager terminals 104 may be general purpose computers with full functionality (e.g., hard drives, CD-ROM drives, etc.) and a full set of the software applications used in the company (e.g., e-mail, word processor, database tools, spreadsheet, Web browser, etc.). This allows the incident managers to perform their functions with maximum flexibility and functionality.

The ACC manager terminals 106, like the incident manager terminals 104, may also be general purpose computers that are fully functional and have a full complement of applications. These terminals 106 may be used by authorized individuals referred to herein as "ACC managers" to manage the remote access aspect of the ACC 102. In general, the ACC managers are responsible for granting the technical support personnel selected by the incident managers access to the company's IT infrastructure and business applications needed to resolve an incident. The ACC managers may selectively provide this access as needed based on the type of incident needing resolution, as will be further explained later herein.

As for the thin client terminals 108, these terminals may be used by the technical support personnel as remote desktops to perform the actual work needed to resolve an incident. Unlike the incident manager terminals 104 and the ACC manager terminals 106, the thin client terminals 108 may be dedicated computers that have mainly Web browsing and remote desktop functionality. Thus, functionality such as electronic messaging, Internet access, file transfer, copy/paste, and the like may be disabled on the thin client terminals 108 in some implementations. Such thin client terminals 108 may be software-based thin clients, hardware-based thin clients, or a combination of both. Access to the company's IT infrastructure and business applications may then be provided through the thin client terminals 108 on a per-incident basis. In this way, the technical support personnel may still access the company's IT infrastructure and business applications, but with minimal risk to the security of the infrastructure and business applications.

In addition to the above, an ACC firewall 110 may be provided to prevent unauthorized access to the incident manager terminals 104, ACC manager terminals 106, and thin client terminals 108 from outside the ACC 102. Another firewall 112, which may be a business-to-business (B2B) firewall, may be provided to prevent unauthorized access to a proxy server 114, which may be an extended mark-up language (XML) gateway server. An additional firewall 116, which may be an enclave firewall, may be provided to prevent unauthorized access to an ACC server 118 and an ACC database 120. Yet another firewall 122, which may be a third-party electronic community (EC) firewall, may be provided to prevent unauthorized access to a plurality of virtual desktops 124. These firewalls 110, 112, 116, and 122 may be implemented using standard firewall technology known to those having ordinary skill in the art and are therefore not discussed in detail here.

With respect to the proxy server 114, as the name implies, the proxy server 114 may operate as a proxy between the ACC server 118 and ACC database 120 and the ACC 102. The proxy server 114 may be located outside the ACC 102 and may offer the only path from the ACC 102 and the virtual desktops 124 through which the ACC server 118 and ACC database 120 may be accessed. This isolation helps prevent any unauthorized access to the ACC server 118 and ACC database 120, thus ensuring that the security and integrity of these systems are not easily compromised.

The security of the ACC server 118 and the ACC database 120 is particularly important considering their roles in controlling the access given to the technical support personnel. For example, when technical support personnel are assigned to incidents, the ACC server 118 may confirm the identities of the technical support personnel. The ACC server 118 may perform this confirmation, for example, by communicating with an authentication server 126, which may be any suitable authentication server (e.g., Microsoft Active Directory), to obtain verification of the identities of the technical support personnel. Similarly, when user IDs, passwords, or other credentials for the company's IT infrastructure and business applications are needed, the ACC server 118 may obtain these credentials from the ACC database 120. The ACC server 118 may also provide or otherwise cause these credentials to be provided directly to the IT infrastructure and business applications so that no intervention by the technical support personnel is needed. Therefore, in some implementations, the ACC server 118 and the ACC database 120 may be ensconced in a secure enclave and physical entry to the enclave may be restricted to help ensure their security.

In accordance with the disclosed embodiments, the above-mentioned access to the company's IT infrastructure and business applications may be provided through the virtual desktops 124. Such virtual desktops 124 may be implemented using any suitable computing systems that are capable of supporting one or more virtual terminals, for example, one or more Windows™, UNIX™, or Linux™ workstations, servers, or other similar computing systems. These virtual desktops 124 may then be used to open remote access sessions to the company's IT infrastructure and business applications, depicted in FIG. 1 as one or more production, development, and/or test systems 128. Alternatively, or in addition, the virtual desktops 124 may connect to a jump server 130 that may in turn provide access to the production, development, and/or test systems 128.

As used herein, a production system is a system or application that has already been released and is fully operational and accessible by its intended users. On the other hand, a development system is a system or application that is currently undergoing development and design.

In some embodiments, the selection of which virtual desktops 124 to allow the technical support personnel to use may depend on the particular production, development, and/or test system 128 that needs service. The reason is because in some embodiments, certain virtual desktops 124 may be pre-assigned to certain production, development, and/or test systems 128 and may only have the software programs or tools for those production, development, and/or test systems 128. Such software programs or tools may include, for example, text editing tools, file management tools, software emulation tools, and other problem-solving/troubleshooting tools. The pre-assignment may be based on certain predefined service areas, for example, type of operating system (e.g., Windows, UNIX, etc.), type of computing system (e.g., server, mainframe, etc.), type of software application (e.g., accounting, inventory, etc.), and the like. These pre-assignments help ensure that the virtual desktops 124 will have the necessary software programs or tools needed for their respective service areas. In other embodiments, however, all virtual desktops 124 may be loaded with the software programs and tools needed to work on all service areas. In still other embodiments, the required software programs or tools may be loaded on the virtual desktops 124 dynamically or on an as-needed basis. In the latter embodiments, predefined profiles may be used that specify specific software programs or tools to be loaded based on the particular service area of the incident.

Note that in the above arrangement, the technical support personnel may not be allowed to acquire or otherwise know the user IDs, passwords, and other credentials being used to access the production, development, and/or test systems 128. Instead, these user IDs, passwords, and other credentials may be obtained by the ACC server 118 from the ACC database 120 and sent in the background to the virtual desktops 124 where they are then passed to the production, development, and/or test systems 128. In other embodiments, however, the ACC server 118 may provide the user IDs, passwords, and other credentials to the technical support personnel (via the virtual desktops 124) who may then manually pass the credentials to the production, development, and/or test systems 128 being accessed.

In general operation, after being assigned to work on a given incident by an incident manager and approved to access a given virtual desktop 124 by an ACC manager, one of the technical support personnel may use his/her thin client terminal 108 to connect to the virtual desktop 124. From the virtual desktop 124, the technical support personnel may send a request to the ACC server 118 to access a particular production, development, and/or test system 128. Once this request is granted (by the ACC manager), a remote access session may be opened from the virtual desktop 124 to the production, development, and/or test system 128. The technical support person may then perform, through the thin client terminal 108 and the virtual desktop 124, various tasks needed on the production, development, and/or test system 128 to resolve the incident.

In some embodiments, instead of (or in addition to) connecting the technical support person to the actual production, development, and/or test system 128, the virtual desktop 124 may be configured to connect the technical support person to a jump server 130 that is in turn connected to the production, development, and/or test system 128. The jump server 130 may then operate as a proxy between the technical support person and the production, development, and/or test system 128 to prevent the technical support person from directly accessing the production, development, and/or test system 128. An example of such a jump server 130 may be a server running PowerBroker from Symark International, Inc.

Note in the foregoing that, while a single technical support person may be assigned to any given incident, it is also possible for multiple technical support persons to be assigned to the same incident so that more than one technical support person may be given access to the same production, development, and/or test system 128 (albeit through different thin client terminals 108 and virtual desktops 124). In such an arrangement, a group of user IDs, passwords, and other credentials may be reserved or otherwise set aside for the production, development, and/or test system 128 to be used by the technical support personnel for that specific production, development, and/or test system 128. One or more databases may then be set up to record and track which user IDs and passwords are being used by which technical support personnel on which production, development, and/or test system 128 for which incidents and so forth.

Figure 2:
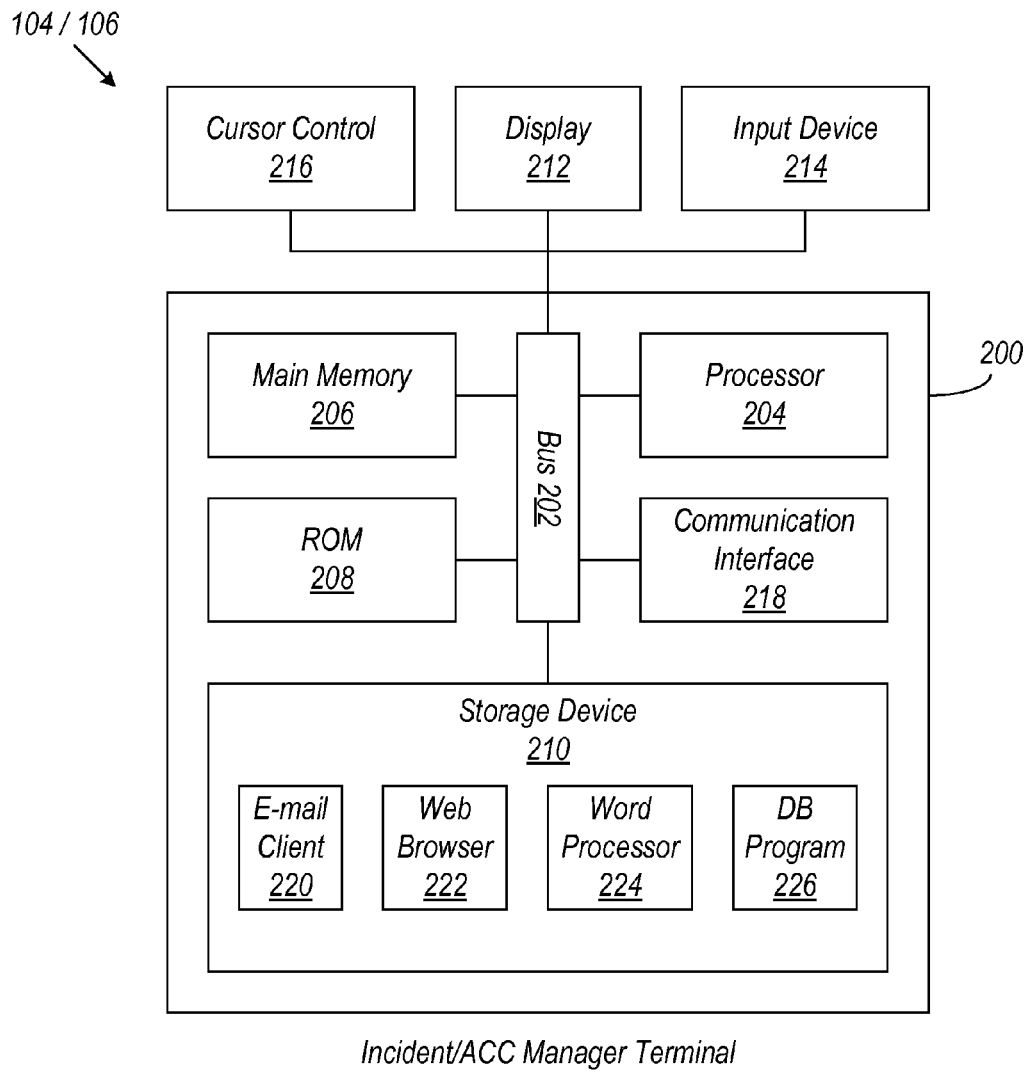
FIG. 2 illustrates an exemplary computer system that may be used as an incident manager terminal and/or ACC manager terminal according to the disclosed embodiments.

FIG. 2 illustrates an example of the incident manager terminal 104 and/or the ACC manager terminal 106 in more detail according to the disclosed embodiments. As can be seen, the incident manager terminal 104 and/or the ACC manager terminal 106 may be a general purpose computer system 200, such as a desktop computer, laptop computer, workstation, and the like. The computer system 200 typically includes a bus 202 or other communication mechanism for communicating information and a processor 204 coupled with the bus 202 for processing information. The computer system 200 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computer system 200 may further include a read-only memory (ROM) 208 or other static storage device coupled to the bus 202 for storing static information and instructions for the processor 204. A non-volatile computer-readable storage device 210, such as a magnetic, optical, or solid state device, may be coupled to the bus 202 for storing information and instructions for the processor 204.

The computer system 200 may be coupled via the bus 202 to a display 212, such as a cathode ray tube (CRT) or liquid crystal display (LCD), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non-volatile media, volatile media, and transmission media. Transmission media may include coaxial cables, copper wire and fiber optics, including wires of the bus 202. Transmission may take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The computer system 200 may also include a communication interface 218 coupled to the bus 202. The communication interface 218 typically provides a two way data communication coupling between the computer system 200 and the network 110. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

As mentioned above, the incident manager terminal 104 and/or the ACC manager terminal 106 may contain a full complement of applications commonly used in the company. These applications may be run from the storage device 210 of the computer system 200 and may include, for example, an e-mail client 220, a Web browser 222, a word processor 224, a database program 226, and the like. Other applications not expressly shown may include a spreadsheet program, a graphics program, and the like. The reason for providing a full complement of applications is to enable the incident and/or ACC managers to perform whatever tasks are needed, such as gathering information and communicating with others within the company, and also because the incident and/or ACC managers are typically authorized company employees and therefore present less of a security risk than the technical support personnel.

In some embodiments, however, rather than deploying a general purpose computer having a full complement of applications for the incident manager terminal 104 and/or the ACC manager terminal 106, it is also possible to use a computer having limited functionality and a reduced set of applications, similar to the thin client terminal 108. Any additional functionality and/or applications that may be needed by the incident and/or ACC managers may then be provided, for example, from a remotely located server. Such embodiments may be particularly useful, for example, where security for the ACC 102 may be difficult to maintain.

Figure 3:
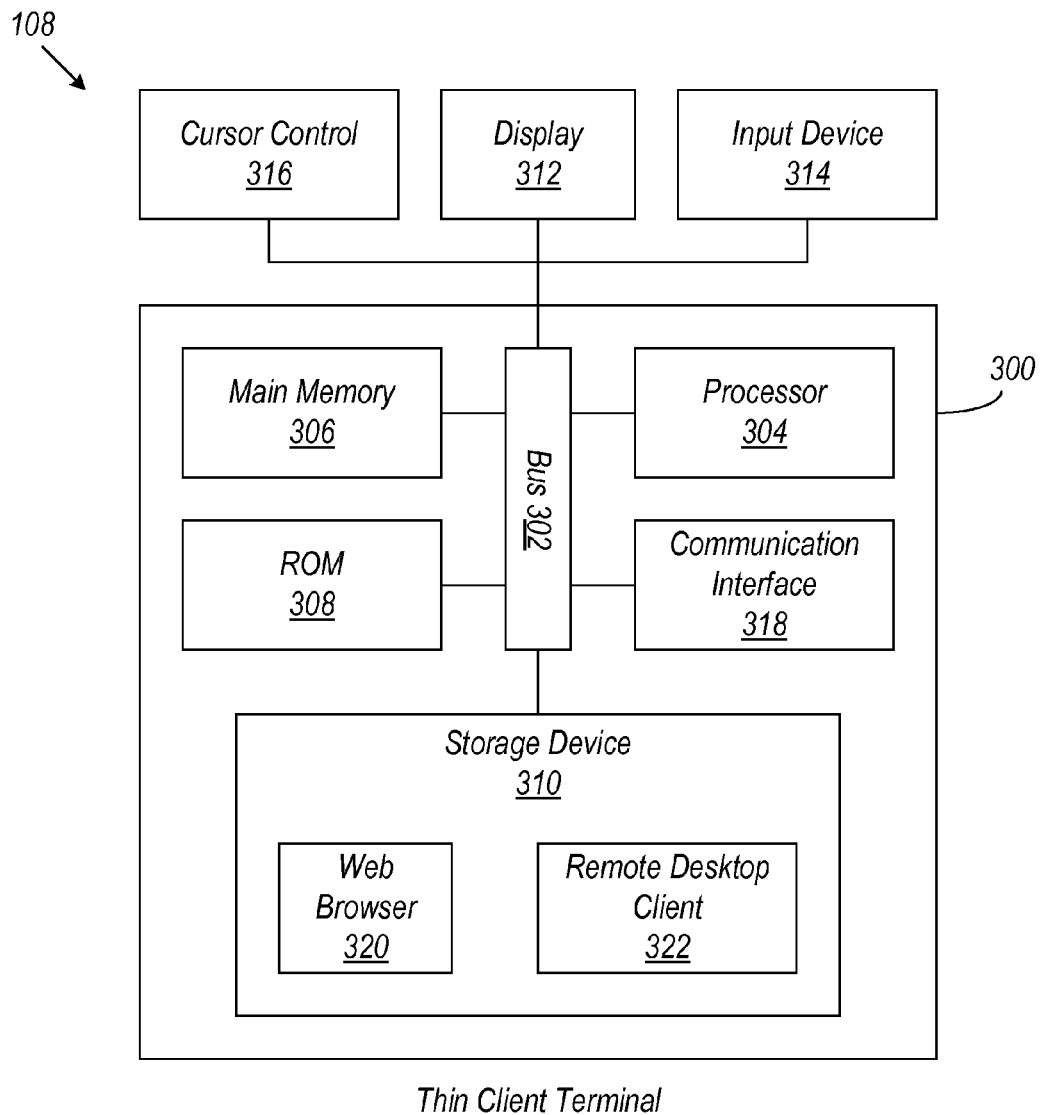
FIG. 3 illustrates an exemplary computer system that may be used as a thin client terminal according to the disclosed embodiments.

FIG. 3 illustrates an example of a thin client terminal 108 in more detail according to the disclosed embodiments. As explained above, each thin client terminal 108 may be a dedicated computer system 300 with reduced functionality that may be used to remotely access the virtual desktops 124. The dedicated computer system 300 may be a desktop computer, laptop computer, workstation, and the like, but is preferably a laptop computer, as these computers typically have their own battery and do not need a backup power supply. Such a dedicated computer system 300 may contain many of the same components as the general purpose computer system 200 of FIG. 2, including a bus 302, a processor 304, a main memory 306, a ROM 308, a storage device 310, a display 312, an input device 314, a cursor control 316, and a communication interface 318.

However, unlike the general purpose computer system 200, the dedicated computer system 300 may simply have a Web browser 320 and a remote desktop client 322 stored on its storage device 310. Where the operating system running on the dedicated computer system 300 is a Microsoft Windows operating system, the remote desktop client 322 may be the Remote Desktop Client built in to certain versions of the Windows operating system. Examples of such a dedicated computer system 300 may include Hewlett-Packard Company's Thin Clients, Wyse Technology's WinTerms, NeoWare, Inc.'s Appliances, and the like.

Figure 4:
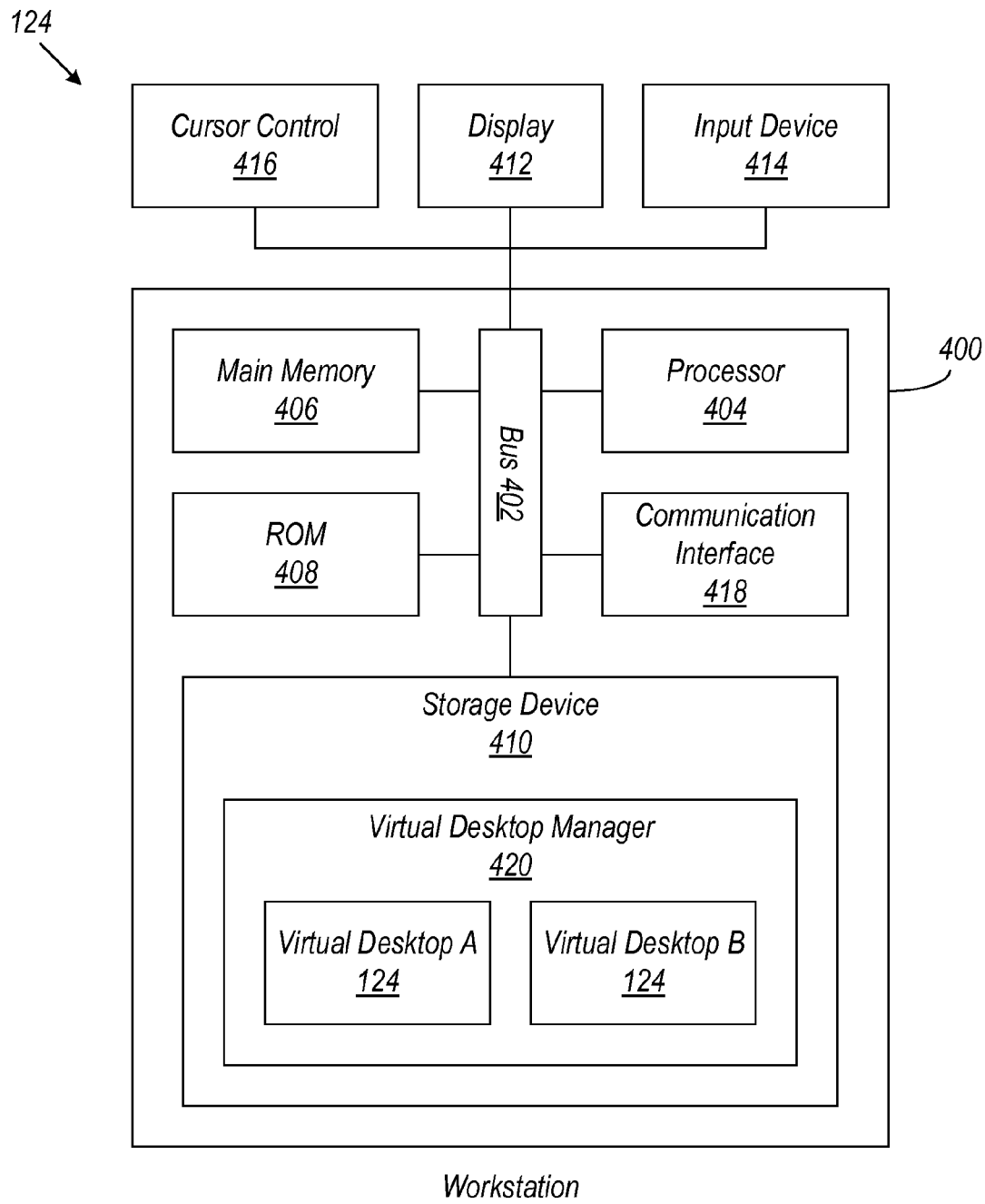
FIG. 4 illustrates an exemplary computer system that may be used as a virtual desktop according to the disclosed embodiments.

The thin client terminal 108 may then be used to remotely access one of the virtual desktops 124 (through the firewalls 110 and 122) according to the disclosed embodiments. An example of the virtual desktops 124 is shown in FIG. 4, where a workstation 400 or similar computing system may be used to implement one or several virtual desktops 124. The workstation 400 may contain many of the same components, or a locked down version thereof, as the general purpose computer system 200 of FIG. 2, such as a bus 402, a processor 404, a main memory 406, a ROM 408, a storage device 410, a display 412, an input device 414, a cursor control 416, and a communication interface 418.

In accordance with the disclosed embodiments, the workstation 400 may have installed thereon a virtual desktop manager 420 for providing one or more virtual desktops 124. The virtual desktop manager 420 may be any terminal service that is capable of supporting one or more of the virtual desktops 124, two of which are shown here as Virtual Desktops A and B, on the workstation 400. Examples of virtual desktop managers 420 that may be used may include Microsoft Windows Terminal Service, Virtual Desktop Infrastructure from VMware, Inc., and the like. In the present implementation, because the thin client terminals 108 are configured to use Windows' Remote Desktop Client (as opposed to some other remote access application) to access the virtual desktops 124, the virtual desktops 124 may be Windows-based virtual desktops. In alternative implementations, however, other virtual desktops 124 known to those having ordinary skill in the art may certainly be used without departing from the disclosed embodiments.

Figure 5:
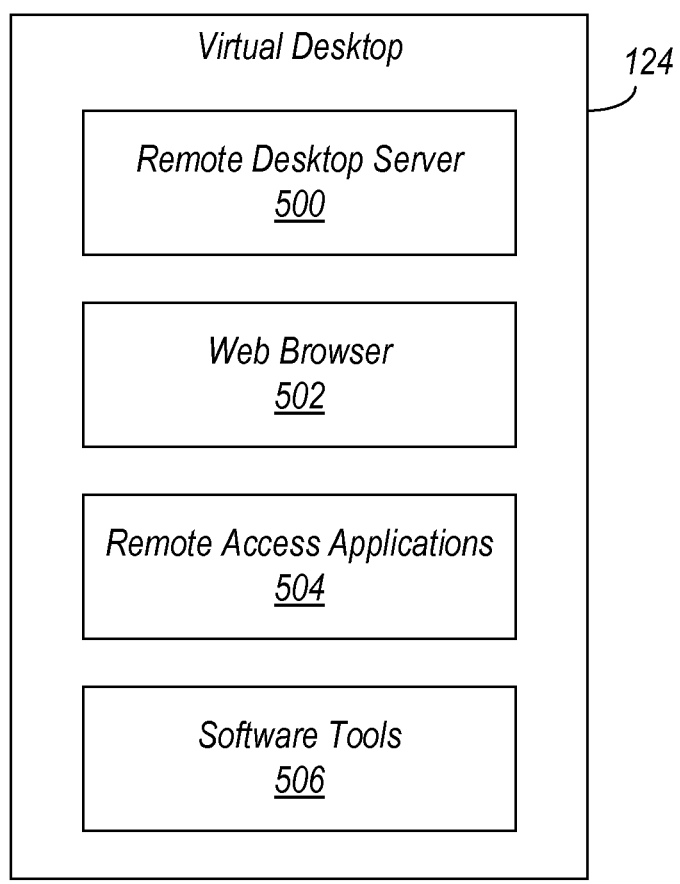
FIG. 5 illustrates the exemplary virtual desktop according to the disclosed embodiments in more detail.

FIG. 5 illustrates an example of one of the virtual desktops 124 in more detail according to the disclosed embodiments. As can be seen, the virtual desktop 124 may provide a number of applications, including a remote desktop server 500, a Web browser 502, one or more remote access applications 504, and one or more software programs or tools 506 for resolving/troubleshooting incidents. Note that each technical support person may be allowed to access one virtual desktop 124 at a time and typically stays on the same virtual desktop 124 until he/she has resolved the incidents that have been assigned to him/her (or until his/her shift is over).

In general, the remote desktop server 500 may function to establish a remote desktop session with the remote desktop client 322 (see FIG. 3) of the thin client terminals 108. Such a remote desktop server 500 may be the Remote Desktop Server available in certain versions of Windows where, as here, the remote desktop client 322 being used is the Remote Desktop Client available in certain versions of Windows. Of course, other remote desktop servers 500 may be used with other operating systems without departing from the scope of the disclosed embodiments.

As for the Web browser 502, any suitable Web browser may be used, such as Internet Explorer, Mozilla, Netscape, and the like. Such a Web browser may then be used by the technical support personnel to access the ACC server 118 from the virtual desktop 124.

The one or more remote access applications 504 may similarly be any suitable remote access applications 504 that are capable of opening a remote access session with either the production, development, and/or test systems 128, or the jump server 130. Examples of remote access applications 504 that may be used include PuTTY for UNIX-based systems, Remote Desktop for Windows-based systems, PCOMM for IBM mainframes, and the like.

Finally, the software programs or tools 506 may be any suitable software tools commonly used by those having ordinary skill in the art for resolving/troubleshooting incidents, such as text editing tools, file management tools, software emulation tools, and the like.

Although not expressly shown, in some embodiments, one or more ACC databases may also be provided on the ACC server 118 to record and track the technical support personnel's access to the production, development, and/or test system 128. Examples of information that may be tracked include which technical support personnel are using which virtual desktop 124 to access which production, development, and/or test system 128 to resolve which incident using which user IDs and passwords, and the time, date and duration that the technical support personnel accessed the production, development, and/or test system 128, and the like.

Figure 6:
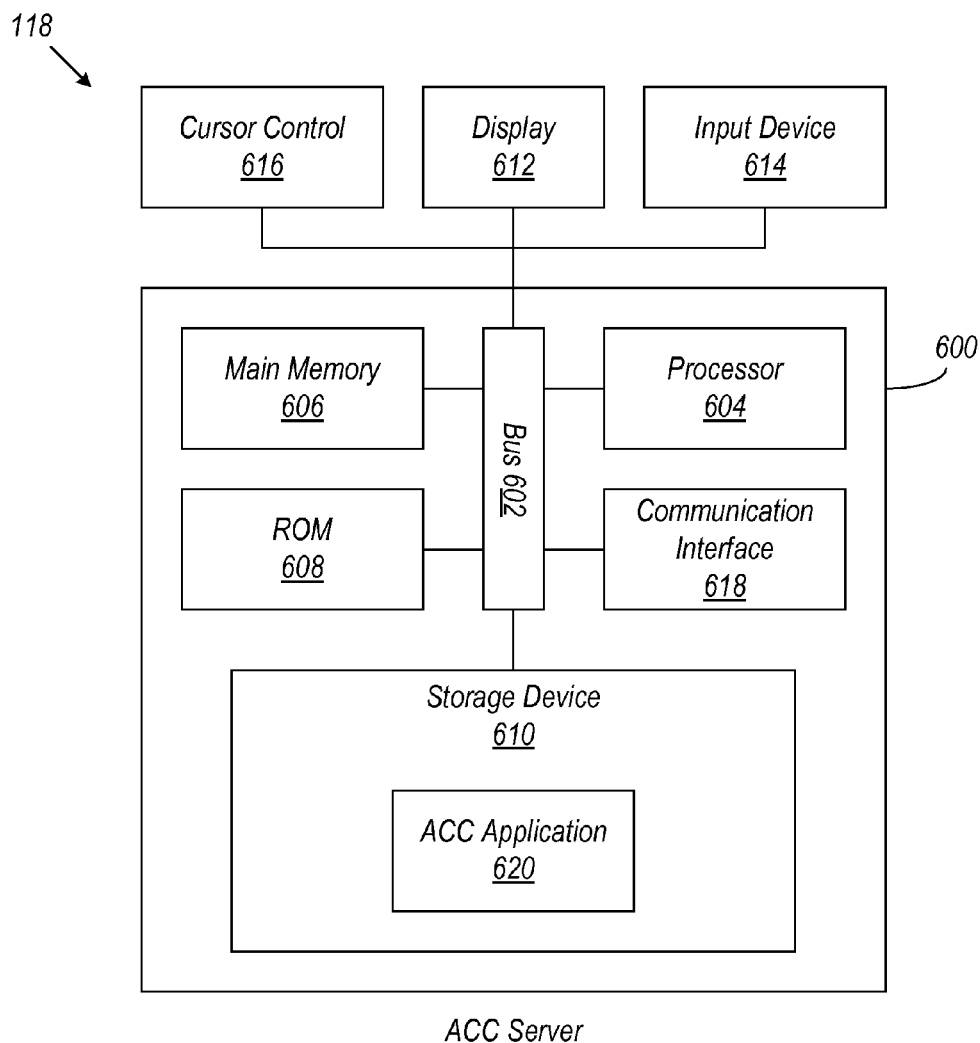
FIG. 6 illustrates an exemplary computer system that may be used as an ACC server according to the disclosed embodiments.

Turning now to FIG. 6, an example of the ACC server 118 is shown according to the disclosed embodiments. The ACC server 118, as the name suggests, may be a server computer 600, or it may also be a workstation, personal computer, and the like. The server computer 600 may contain many of the same components as the general purpose computer system 200 of FIG. 2, for example, a bus 602, a processor 604, a main memory 606, a ROM 608, a storage device 610, a display 612, an input device 614, a cursor control 616, and a communication interface 618. Such an ACC server 118 may then be used to provide indirect and temporary access to the production, development, and/or test systems 128 of the company. To this end, an ACC application 620 may be present on the ACC server 118 to help control or limit access to the production, development, and/or test systems 128 of the company.

Figure 7:
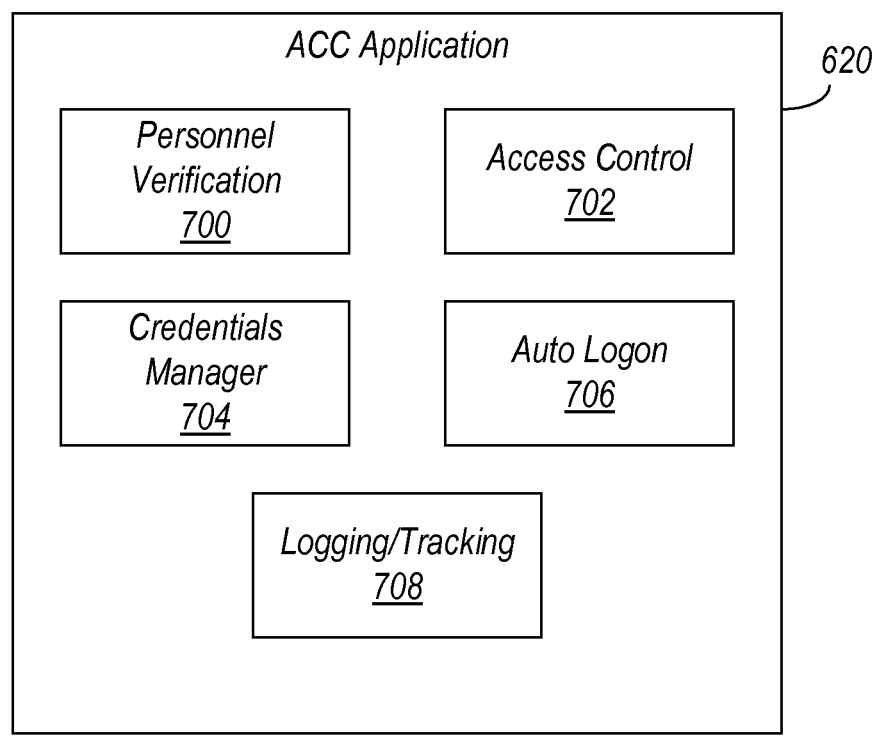
FIG. 7 illustrates an exemplary ACC application according to the disclosed embodiments.

FIG. 7 illustrates the ACC application 620 according to the disclosed embodiments in more detail. In some embodiments, the ACC application 620 may be a Web-based application that has a plurality of Web pages, each page providing a different set of functions and options. Users, including incident managers, ACC managers, and technical support personnel, may then access certain pages of the ACC application 620 by entering the URL (uniform resource locator) of the ACC application 620 into a standard Web browser, such as Internet Explorer, Mozilla, Netscape, and the like. As can be seen, the ACC application 620 may be composed of a number of functional components, including a personnel verification module 700, an access control module 702, a credentials manager 704, an auto logon module 706, and a logging/tracking module 708. Following is a description of the functionality of each component.

The personnel verification module 700 may operate to verify the identity of the users who access the ACC application 620. For example, after technical support personnel enter the URL (uniform resource locator) of the ACC application 620, they may be required to provide their user IDs and passwords in order to access the ACC application 620. Upon receiving a user ID and password, the personnel verification module 700 may connect to the authentication server 126 (see FIG. 1) of the company and verify that the user ID and password are valid. If they are verified, then the technical support personnel will be allowed to proceed further. Verification of the user ID and password may be performed using any technique known to those having ordinary skill in the art without departing from the scope of the disclosed embodiments. Examples of software tools that may be used to verify user IDs and passwords are available from Quest Software, Inc.

The access control module 702 may operate to control access to the virtual desktops 124 and hence the production, development, and/or test systems 128 for the ACC application 620. That is, the access control module 702 may require that all access to the virtual desktops 124 be approved by the ACC manager before the technical support personnel are allowed to connect to the virtual desktops 124. In addition, once the ACC manager has granted approval for a technical support person to access a given virtual desktop 124, the access control module 702 may automatically connect the technical support person's thin client terminal 108 to that virtual desktop 124, thereby avoiding intervention by the technical support person. This may be accomplished, for example, via the Web browser 320 interacting in the background with the remote desktop client 322 (see FIG. 3) on the thin client terminal 108, particularly where the Web browser 320 is Internet Explorer and the remote desktop client 322 is Windows' Remote Desktop Client. The technical support person may thereafter use that virtual desktop 124 until he/she resolves the incident or his/her work day is completed.

In some embodiments, the particular virtual desktops 124 for which the technical support personnel may be approved may depend on the type of incidents that have been assigned to the technical support personnel. For example, if a technical support person has been assigned a UNIX-related incident and an IBM mainframe-related incident, then he/she may receive approval for a virtual desktop 124 that contains certain remote access applications 504 (see FIG. 5), such as PuTTY and PCOMM, but not other remote access applications 504, such as Remote Desktop. On the other hand, if a technical support person has only been assigned a UNIX-related incident, then he/she may receive approval for a virtual desktop 124 that only contains PuTTY, but not PCOMM or Remote Desktop. This arrangement provides greater selection and control over the particular applications that may be used by the technical support person while he/she is on the virtual desktop 124. In alternative embodiments, however, every application that may be needed by any technical support person may be provided beforehand on certain ones of the virtual desktops 124. This latter arrangement allows for greater flexibility in that these virtual desktops 124 may be approved for the technical support personnel regardless of the types of incidents the technical support personnel have been assigned.

In some embodiments, instead of the access control module 702 automatically connecting the technical support personnel's thin client terminals 108 to the virtual desktops 124, the connection may be accomplished manually, for example, through a hyperlink, pointer, or similar navigation mechanism. The access control module 702 may provide (or may cause to be provided) this navigation mechanism to the technical support personnel once the ACC manager has granted approval to the technical support personnel to access the virtual desktops 124. The technical support personnel may thereafter manually deploy the navigation mechanism to connect the thin client terminals 108 to the virtual desktops 124.

After a connection to the virtual desktops 124 has been established, the access control module 702 may require the technical support personnel to obtain further approval from the ACC manager to connect to the production, development, and/or test systems 128. In some embodiments, the technical support personnel may obtain this approval by selecting a particular production, development, and/or test system 128, for example, from a drop down list generated by the access control module 702 and submitting a request for access to that production, development, and/or test system 128 via the virtual desktop 124. The ACC manager may then approve or not approve the request as appropriate via the access control module 702.

Once the ACC manager has approved access to a production, development, and/or test system 128, the credentials manager 704 may operate to retrieve any user IDs, passwords, and other credentials needed to access the production, development, and/or test system 128. The credentials manager 704 may perform this function by connecting to the ACC database 120 (see FIG. 1) and looking up the credentials for the production, development, and/or test systems 128 to be accessed by the technical support personnel. As mentioned previously, these credentials may be a group of user IDs, passwords, and other credentials reserved or otherwise set aside for the production, development, and/or test systems 128 to be used by the technical support personnel for specific production, development, and/or test systems 128. In some embodiments, instead of the credentials manager 704 automatically retrieving the credentials for a given incident, the ACC manager may manually assign one of the credentials to be used, such as a system ID (also production ID), and the credentials manager 704 may automatically retrieve all other needed credentials (e.g., user ID, passwords, etc.) corresponding to the system ID selected by the ACC manager. A system ID, as understood by those having ordinary skill in the art, is typically a logon ID that is associated with a particular system, as opposed to a user ID, which is typically independent of the system.

In accordance with the disclosed embodiments, the credentials manager 704 may provide the credentials retrieved for a particular production, development, and/or test systems 128 to the auto logon module 706. The auto logon module 706 may thereafter use the credentials to connect the virtual desktops 124 to the production, development, and/or test systems 128 requested by the technical support personnel. More specifically, the auto logon module 706 may open a remote session between the virtual desktops 124 and the production, development, and/or test systems 128 requested by the technical support personnel. The auto logon module 706 may open this remote session by causing to be downloaded to the virtual desktops 124 a launch routine (see FIG. 8) that may be executed by the technical support personnel.

The launch routine may be, for example, a Java-based routine that calls an appropriate one of the remote access application 504 (see FIG. 5) when executed by the technical support personnel in order to open a remote session between the virtual desktops 124 and the production, development, and/or test systems 128. The particular remote access application 504 that is called (e.g., PuTTY for UNIX-based systems, Remote Desktop for Windows-based systems, PCOMM for IBM mainframes) may depend on the specific credentials provided by the credentials manager 704. These credentials, in turn, may correspond to the production, development, and/or test systems 128 requested by the technical support personnel. It is also possible in some embodiments to automatically execute the launch routine as soon as approval is granted by the ACC manager to access the production, development, and/or test systems 128 without any intervention by the technical support personnel. The launch routine may thereafter automatically (i.e., in the background) pass the credentials to the production, development, and/or test systems 128 via the remote access application 504 to thereby connect the virtual desktops 124 to the production, development, and/or test systems 128 requested by the technical support personnel.

The above arrangement has an advantage in that the technical support personnel are not exposed to the credentials and therefore cannot misuse them. In other embodiments, however, instead of automatically providing the credentials directly to the production, development, and/or test systems 128, the credentials manager 704 may provide the credentials in text form to the technical support personnel. The technical support personnel may then use the credentials to manually log on to the production, development, and/or test systems 128.

Finally, the logging/tracking module 708 operates to record the activities of the technical support personnel on the thin client terminals 108, the virtual desktops 124, and the production, development, and/or test systems 128. In some embodiments, the recording may be a full session capture of all activities carried out by the technical support personnel (e.g., keystroke logging, etc.). In other embodiments, however, the logging/tracking module 708 may provide a more limited recording, for example, just the activities related to the request for access (e.g., who made the request, who authorized it, to which system, etc.). The logs may be subsequently reviewed by company management to determine if any changes are needed in procedures, technical support personnel, infrastructure, and the like.

The personnel verification module 700, access control module 702, credentials manager 704, auto logon module 706, and logging/tracking module 708 may store and retrieve any needed data in the ACC database 120. Such a database 120 may be any structured collection of records known to those having ordinary skill in the art, and it may be accessed by the functional components 700, 702, 704, 706, and 708 either in real time as needed, or according to some predefined schedule. The data stored in the ACC database 120 may generally be all data or information used by the functional components 700, 702, 704, 706, and 708 to carry out their various functions. Such data or information may include data or information on each incident, technical support person, incident manager, ACC manager, organizational unit, service area, virtual desktop, thin client terminal, access credentials, approval given, approval revocation, and the like.

Figure 8:
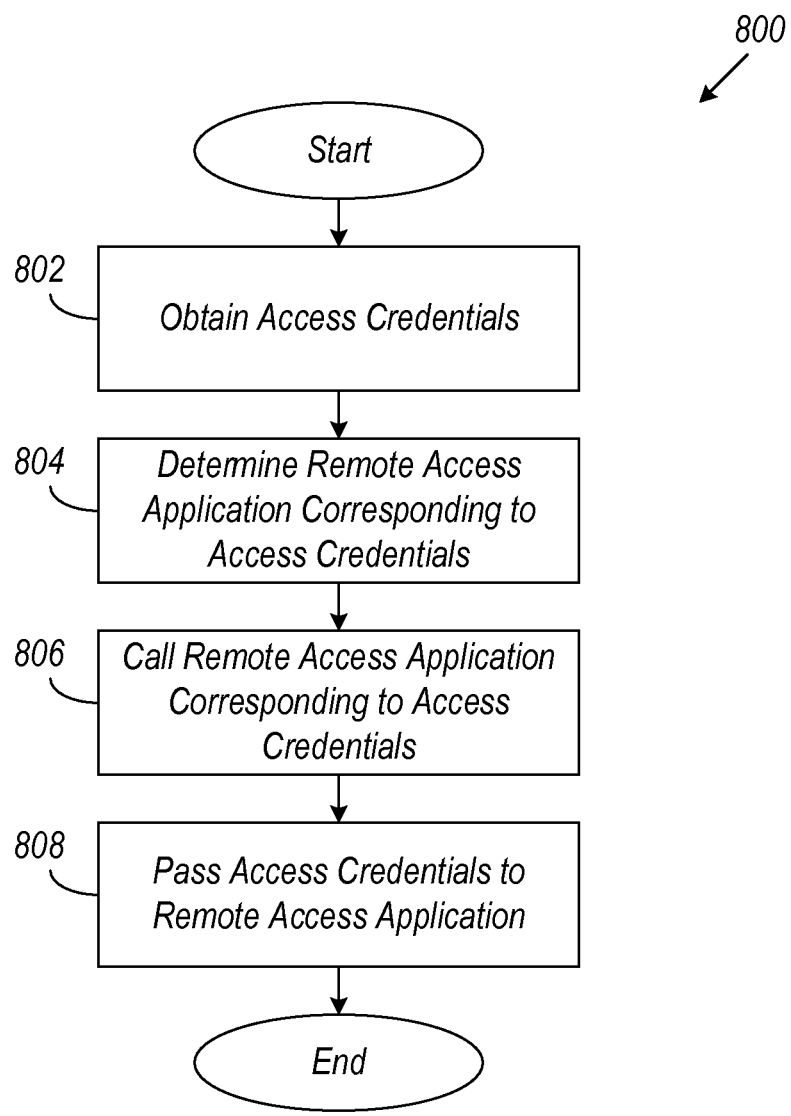
FIG. 8 illustrates an exemplary ACC launch routine according to the disclosed embodiments.

Turning now to FIG. 8, general guidelines are shown in the form of a method that may be used to implement the launch routine disclosed above. As can be seen in FIG. 8, an exemplary method 800 for automatically opening a remote session between the virtual desktops 124 and the production, development, and/or test systems 128 may begin at block 802, where access credentials may be obtained for the production, development, and/or test systems 128. The access credentials may be obtained in real time as needed, for example, via the credentials manager 704, or they may be provided to the virtual desktop along with the launch routine. As mentioned above, in some embodiments, the access credentials may be automatically retrieved for a given incident based on the production, development, and/or test systems 128 involved, or the ACC manager may manually assign one of the credentials, such as the user ID or a system ID (or production ID), and all other needed credentials corresponding to the user ID or a system ID selected by the ACC manager may be automatically retrieved.

At block 804, the remote access application 504 corresponding to the access credentials may be determined. The determination may be conducted in real time as needed, for example, by looking up the information in an appropriate table of the ACC database 120, or the information may be provided beforehand along with the launch routine. At block 806, the remote access application 504 corresponding to the access credentials is called. In one implementation, the calling may be accomplished automatically by executing predefined command line instructions known to those having ordinary skill in the art. In other implementations, a technical support person may need to take one or more actions, such as clicking on a button, in order to call the remote access application 504. Of course, other techniques for calling a remote access application 504 may also be used without departing from the scope of the disclosed embodiments. Finally, at block 808, the access credentials are passed to the remote access application 504 in the manner known to those having ordinary skill in the art (e.g., via command line instructions, etc.).

Figure 9:
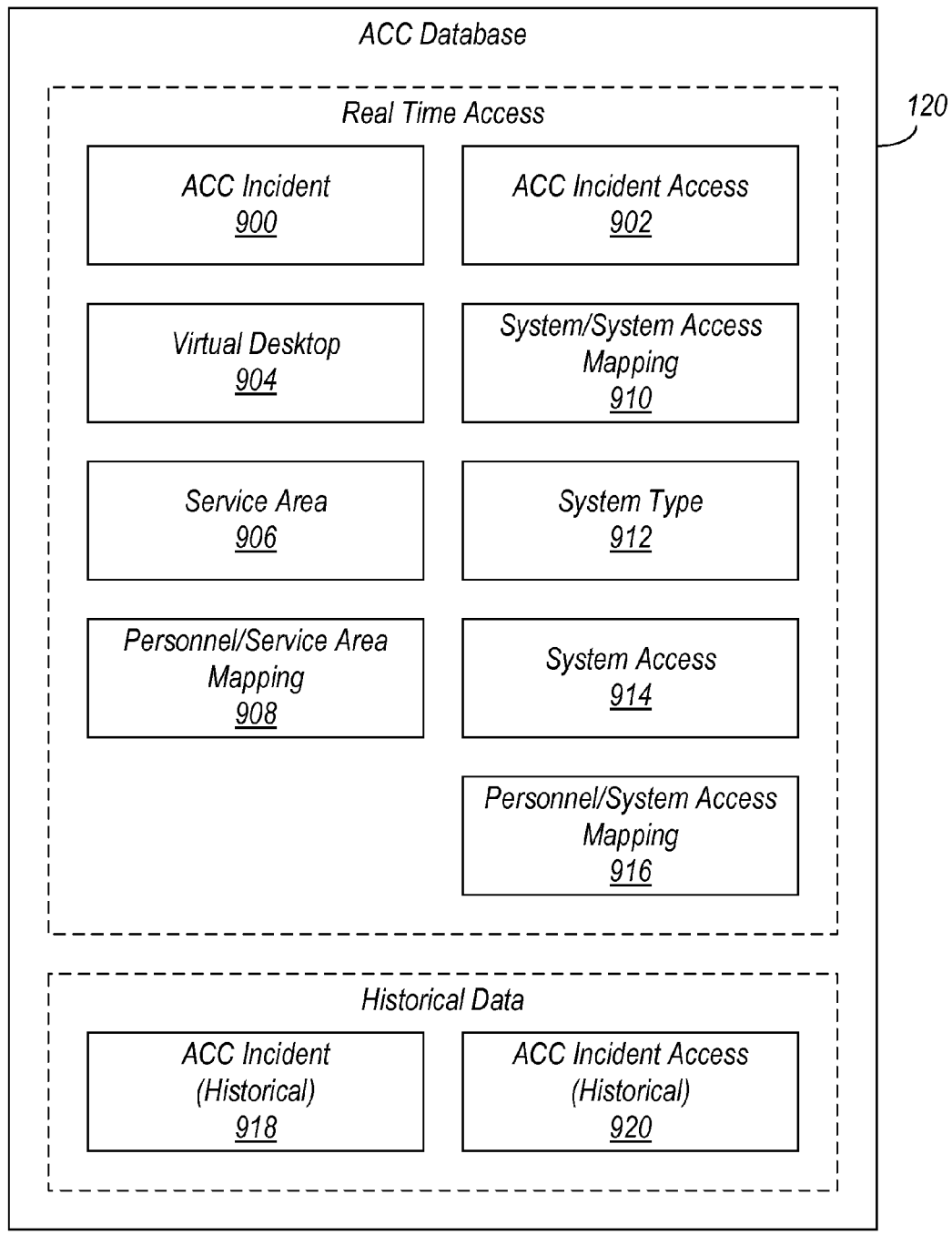
FIG. 9 illustrates an exemplary ACC database according to the disclosed embodiments.

FIG. 9 illustrates an exemplary schema for the ACC database 120. In some embodiments, the ACC database 120 may be a relational database, but other types of databases known to those having ordinary skill in the art may also be used. As can be seen, the ACC database 120 may include several main tables that are supported by a plurality of auxiliary tables. The main tables in the example shown here may include an ACC Incident table 900 and an ACC Incident Access table 902. The ACC Incident table 900 may be designed to store, among other things, information concerning the technical support personnel who have been authorized, and those who are available to be authorized, to resolve a given incident. The ACC Incident Access table 902 may be designed to store, among other things, information concerning the incidents and the approval granted to the technical support personnel to access one or more production, development, and/or test systems 128 in order to work on the incidents. Other main tables may also be provided in the ACC database 120 by those having ordinary skill in the art without departing from scope of the disclosed embodiments.

The auxiliary tables may then provide support for the data in the ACC Incident table 900 and the ACC Incident Access table 902. These auxiliary tables may be simple lists in some embodiments, or they may be arrays of two or more dimensions, as is the case for many types of lookup tables. In the example shown here, the auxiliary tables may include a Virtual Desktop table 904, a Service Area table 906, and a Personnel/Service Area Mapping table 908 for supporting the data in the ACC Incident table 900. To support the ACC Incident Access table 902, in some embodiments, there may be a System/System Access Mapping table 910, a System Type table 912, a System Access table 914, and a Personnel/System Access Mapping table 916. Other auxiliary tables may also be provided in the ACC database 120 by those having ordinary skill in the art without departing from scope of the disclosed embodiments.

The Virtual Desktop table 904 may store, among other things, information concerning the virtual desktops 124 available for use by the technical support personnel to address an incident. To this end, the Virtual Desktop table 904 may include a list of the virtual desktops 104 that are available to be assigned to a technical support person. Authorized personnel may then manually or automatically modify the Virtual Desktop table 904 (and all the other tables of the ACC database 120) as needed from time to time in order to update the Virtual Desktop table 904 (and all the other tables of the ACC database 120).

The Service Area table 906 may be a lookup table for, among other things, information concerning the available service areas to which the technical support personnel may be assigned to address an incident. A "service area" is in essence a logical grouping of virtual desktops 124 that have been dedicated to a particular team of technical support personnel and/or production, development, and/or test systems 128. The logical grouping allows the workstations for those virtual desktops 124 to be preloaded with specific applications and/or software programs that may be needed by the team and/or for the production, development, and/or test systems 128. This obviates the need to preload every workstation with every application and/or software program that may be needed on every virtual desktop 124, thereby realizing a potential savings on software licensing and other costs.

The Personnel/Service Area Mapping table 908, as the name suggests, may provide information linking the various technical support personnel to the service areas they support. Assignment of the technical support personnel to a given service area may be based, for example, on the particular expertise of the technical support personnel, the level of training and/or experience of the technical support personnel, and the like. Such an arrangement allows for ownership of certain production, development, and/or test systems 128 by discrete teams of technical support personnel, which may help facilitate expedited resolution of any incidents arising from those systems and in some cases.

In a similar manner, the system/System Access Mapping table 910 may link the various production, development, and/or test systems 128 to the respective access credentials for these systems. The system access credentials may be, for example, actual production credentials used by system designers and administrators to access the production, development, and/or test systems 128, or they may be access credentials that are separately set up for the technical support team in order to grant them access to the production, development, and/or test systems 128. In either case, it is not necessary to have a unique access credential for each technical support person, as one access credential may be shared among multiple technical support personnel. As mentioned above, however, the technical support personnel generally should not be given the access credentials in order to minimize any security risk.

The System Type table 912 may store, among other things, information concerning the types of production, development, and/or test systems 128 that may need to be accessed by the technical support personnel to resolve an incident. To this end, the System Type table 912 may include a list of various system types, such as Windows, UNIX, AIX, LINUX, whether or not the system is a host, and similar system types known to those having ordinary skill in the art.

The System Access table 914 may store information concerning the actual access credentials used in the System Access Mapping table 910 described above. To this end, the System Access table 914 may include a lookup table of the various access credentials that may be used to access the various production, development, and/or test systems 128.

Finally, the Personnel/System Access Mapping table 916 may provide, among other things, information concerning which technical support person is linked to which access credentials. To this end, the Personnel/System Access Mapping table 916 may provide a lookup table mapping the technical support personnel to one or more system access credentials.

In addition to the real-time versions of the ACC Incident table 900 and the ACC Incident Access table 902, in some embodiments, the ACC database 120 may also include historical, non-real-time versions of the ACC Incident table and the ACC Incident Access table, indicated at 918 and 920, respectively. These historical versions 918 and 920 serve essentially as backup versions of the ACC Incident table 900 and the ACC Incident Access table 902.

Figure 10:
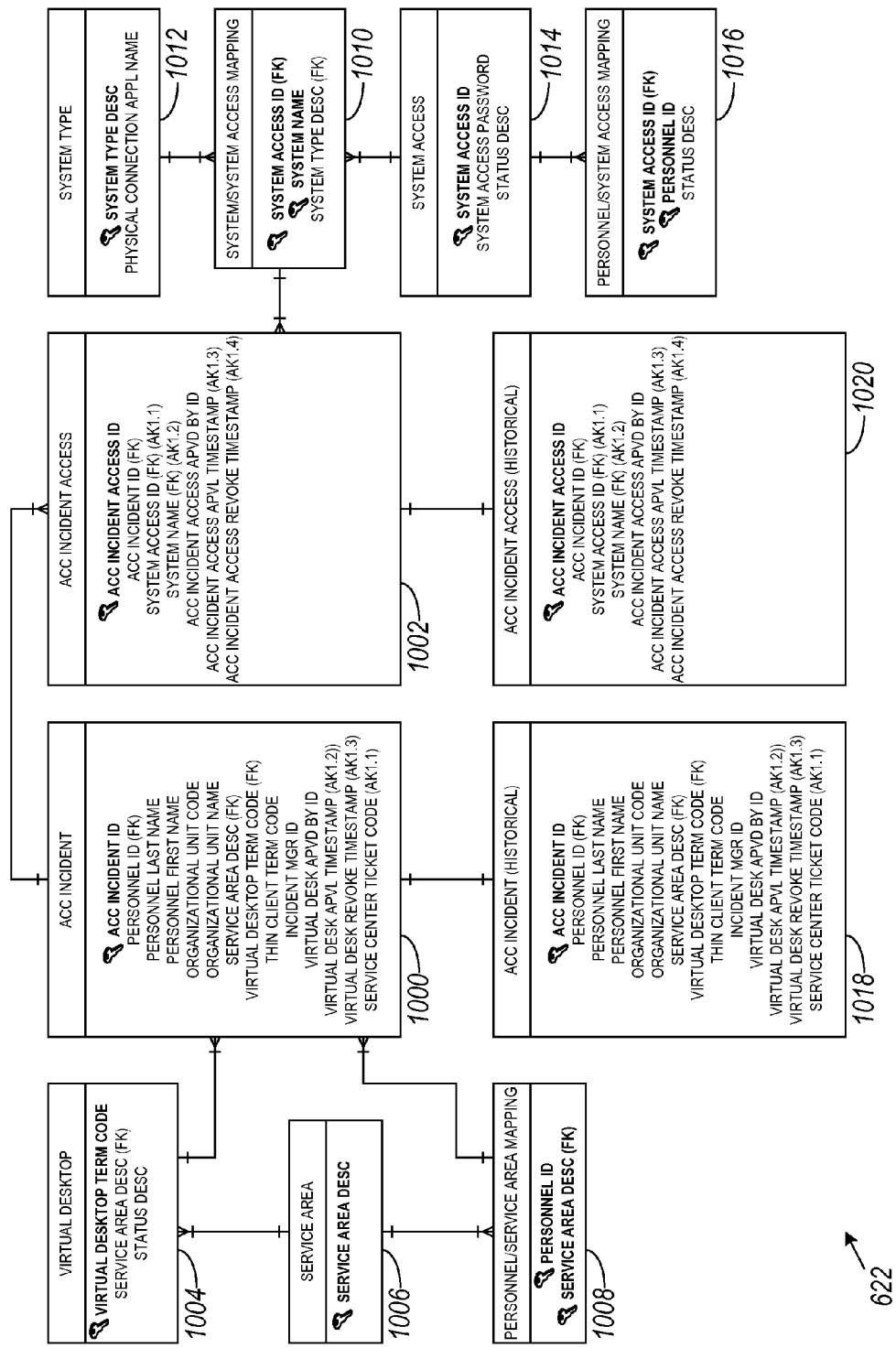
FIG. 10 illustrates the exemplary ACC database according to the disclosed embodiments in more detail.

A more detailed implementation of the ACC database 120 is shown in FIG. 10, where data fields have been provided by way of examples for various data tables. It should be noted that the data tables illustrated in FIG. 10 are exemplary only, and that one or more data tables may be removed from or added to the implementation of FIG. 10 without departing from the scope of the disclosed embodiments. Moreover, any one of the data tables depicted in FIG. 10 may be divided into two or more sub-tables, or two or more of the data tables may be combined into a single table, without departing from the scope of the disclosed embodiments.

In the example of FIG. 10, the ACC database 120 may include an ACC Incident table 1000, an ACC Incident Access table 1002, a Virtual Desktop table 1004, a Service Area table 1006, a Personnel/Service Area Mapping table 1008, a System/System Access Mapping table 1010, a System Type table 1012, a System Access table 1014, and a Personnel/System Access Mapping table 1016. The data tables in FIG. 10 generally correspond to their counterparts in FIG. 9 and therefore only a description of the individual data fields in each table is provided below.

As is customary in the database art, key icons signify data fields that are primary data fields, "FK" signify data fields that are foreign keys (i.e., keys that are primary keys in a different table), and "AK" signify data fields that are alternate keys (i.e., unique data fields that are not primary keys). In addition, conventional relationship indicators are used to show one-to-one and one-to-many relationships, respectively. For example, the ACC Incident table 1000 has a one-to-many relationship with the ACC Incident Access table 1002.

In some embodiments, the data fields of the ACC Incident table 1000 may include an ACC Incident ID field for identifying each incident (e.g., by incident number) received by the ACC 102. Additionally, the ACC Incident ID field may also be designated as a primary key field. Other fields may include a Personnel ID field for identifying the technical support person(s) assigned to each incident (e.g., by employee number), and Personnel Last Name and Personnel First Name fields for recording the first and last name of the technical support person(s) assigned to the incident. Also present may be an Organizational Unit Code field and an Organizational Unit Name field for identifying the particular business units (e.g., accounting department) from which each incident arose. A Service Area Description field may be provided for identifying different logical groups of technical support personnel and/or production, development, and/or test systems 128. A Thin Client Terminal Code may be provided for identifying the thin client terminals (e.g., by terminal number), and an Incident Manager ID field may be provided for identifying the incident manager handling the incident (e.g., by employee number). A Virtual Desktop Approval by ID field may be provided for identifying the ACC manager who provided the approval for a technical support person to access a virtual desktop, along with data fields for recording the Timestamp of the approval and the Timestamp when (e.g., time and date) the approval was revoked by the ACC manager. Finally, a Service Center Ticket Code field may be provided for recording the ACC ticket number assigned to each incident.

As for the ACC Incident Access table 1002, this table may include an ACC Incident Access ID field for recording each system access (e.g., by access number) that has been approved, as well as the ACC Incident ID field discussed with respect to the ACC Incident table 1000. In some embodiments, the ACC Incident Access ID field may be designated as a primary key field. Also present may be a System Access ID field for storing any access credentials (e.g., usernames, passwords, etc.) needed to access each production, development, and/or test systems 128, along with a System Name field for storing the name of the corresponding production, development, and/or test systems 128. An ACC incident access approved by ID field may be provided for identifying the ACC manager (e.g., by employee ID) who provided the approval for a technical support person to access a production, development, and/or test systems 128. Finally, various Timestamp fields may be provided for recording when (e.g., time and date) the access approval was granted by the ACC manager and when the approval was revoked by the ACC manager.

Other data fields of interest may be found in the auxiliary tables and may include a System Type Descriptor field (see System Type table 1012) for storing the system type (e.g., Windows, UNIX, AIX, LINUX, etc.), and a Physical Connection Application Name field (also in System Type table 1012) for identifying the application (e.g., PuTTY, Remote Desktop, PCOMM, etc.) used to access the production, development, and/or test systems 128.

Lastly, historical, non-real-time versions of the ACC Incident table 1000 and ACC Incident Access table 1002 may also be present (indicated at 1018 and 1020) for backup purposes in some embodiments.

Note that other data fields may also be provided in the various main and auxiliary tables described above by those having ordinary skill in the art without departing from scope of the disclosed embodiments. In addition, one or more of the data fields may be manually or automatically maintained and modified as needed from time to time in order to update these one or more of the data fields. For example, one or more of the data fields, such as the System Access ID field and the like, may be linked to other databases used in the company and automatically updated as needed from time to time from those other databases.

Figure 11:
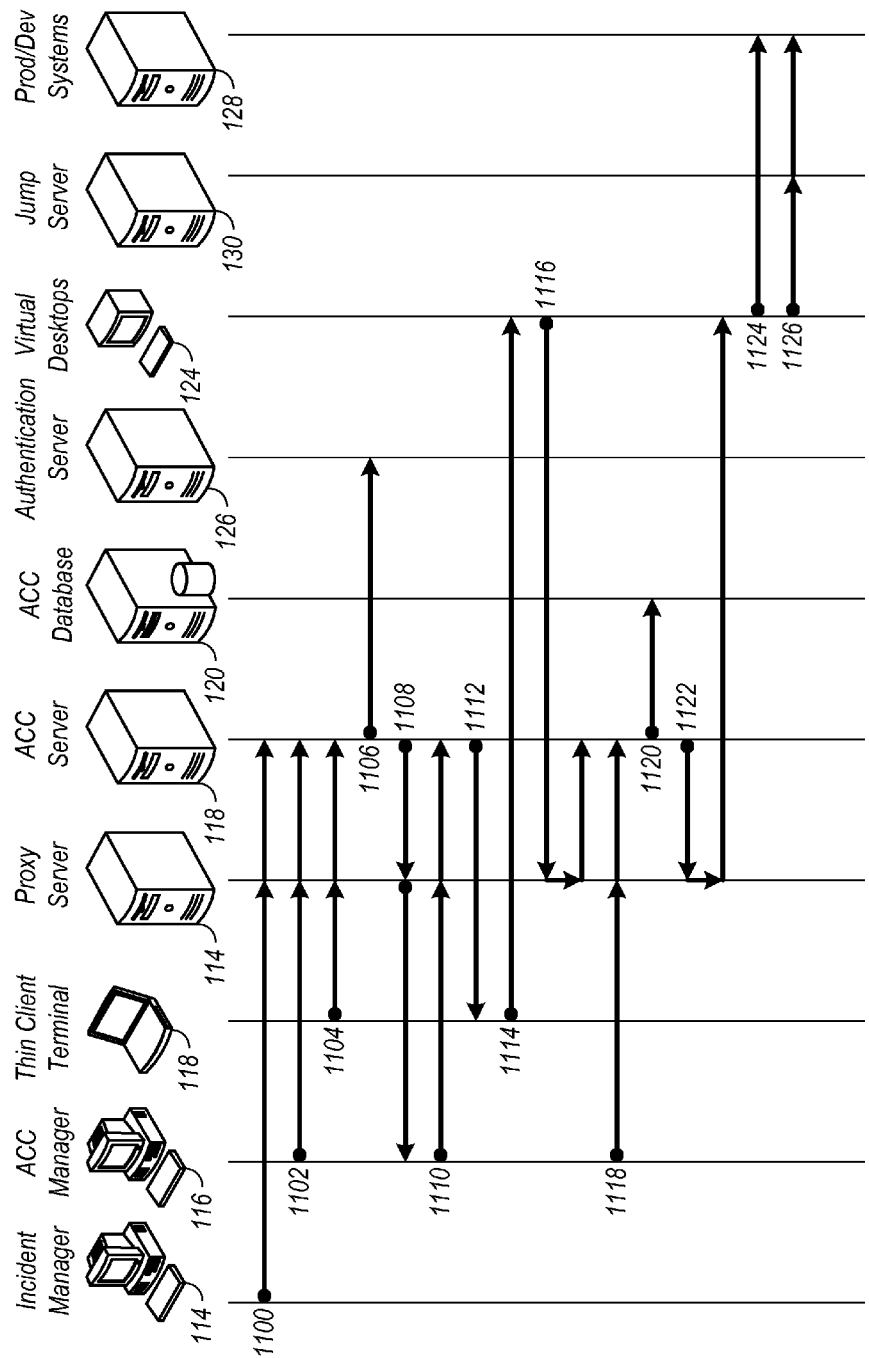
FIG. 11 illustrates an exemplary sequence diagram showing operation of the access control infrastructure according to the disclosed embodiments.

FIG. 11 illustrates an exemplary sequence diagram showing the operation of the embodiments disclosed above in more detail. By way of example and also for ease of understanding, it will be assumed that the thin client terminals 108 and virtual desktops 114 in FIG. 11 are Windows-based and the Web browser thereon is the Internet Explorer Web browser. Note also that while the exemplary diagram in FIG. 11 combines several related events into one or more series of events, those having ordinary skill in the art will understand that different combinations of events resulting in different series of events from those shown in FIG. 11 may certainly be used without departing from the scope of the disclosed embodiments. Also, although they are present, the various firewalls 110, 112, 116, and 112 discussed above with respect to FIG. 1 have been omitted from FIG. 11 for readability and economy of the description. Finally, it should be noted that FIG. 11 was not intended to illustrate every possible event of the disclosed embodiments, but only those events that are useful for an understanding the main concepts and teachings of the disclosed embodiments.

In FIG. 11, operation may begin when an incident is reported to the ACC 102. Various channels may be used to report an incident to the ACC 102, such as by e-mail message, telephone call, intra-company memo, auto-generated alert, in-person communication, and the like.

An incident manager, after entering the ACC 102, logging in to the ACC server 118 (and the ACC application 620 thereon) via an incident manager terminal 104, and receiving notice of the incident, may enter or otherwise create a record of the incident on the ACC server 118, indicated at 1100. Note that the ACC server 118 may only be accessed through the proxy server 114 in order to protect the ACC server 118 from unauthorized access. The incident record may contain various information about the incident, including a description of the incident, the network address of the production, development, and/or test system 118 affected, the service area (e.g., operating system, software application, etc.) involved, and so forth. At this time, the incident manager may also assign one or more technical support personnel from a pool of technical support personnel to work on the incident. The specific technical support personnel that the incident manager may assign to the incident may depend on the service area of the incident and the particular experience and expertise of the technical support personnel.

At 1102, an ACC manager, after entering the ACC 102 and logging in to the ACC server 118 (and the ACC application 620 thereon) via an ACC manager terminal 106, may view the records of various incidents that are pending his/her assignment and approval for virtual desktops 114. In some embodiments, assignment may be to general virtual desktops 114 that contain every application needed by a technical support person to resolve an incident. In other embodiments, assignment may be to specific virtual desktops 114 that are set up for specific service areas and that contain specific software programs or tools needed to resolve the incidents in those service areas.

At 1104, a technical support person, after entering the ACC 102, may log on to the ACC server 118 (and the ACC application 620 thereon) via a thin client terminal 108 by providing his/her user ID and password. At 1106, the ACC server 118 may receive the user ID and password and may communicate with the authentication server 116 to verify the user ID and password of the technical support person. Assuming the user ID and password are verified, then at 1108, the ACC server 118 may send information to the ACC manager that the technical support person has logged on and is awaiting assignment to a virtual desktop 114.

At 1110, the ACC manager, upon seeing the request for a virtual desktop 114, may assign and approve one of the virtual desktops 114 for the technical support person. Once the ACC server 118 receives the assignment and approval for the access request from the ACC manager (via the ACC manager terminal 106), it may initiate a connection from the thin client terminal 108 of the technical support person to the assigned virtual desktop 114 using the Web browser 320 and remote desktop client 322 thereon, indicated at 1112. It is also possible in some embodiments for the ACC server 118 to provide the thin client terminal 108 with a reference, such as a hyperlink, destination name, or similar navigation mechanism, that the technical support person may use to manually initiate the connection to the virtual desktop 114.

The technical support person thereafter logs in to the virtual desktop 114, indicated at 1114, to establish a connection to the virtual desktop 114. Once this connection is established, the technical support person may again access the ACC server 118, but this time from the virtual desktop 114 (again, via the proxy server 114), indicated at 1116. If necessary, the technical support person may provide his/her user ID and password once more to the ACC server 118. It is also possible in some embodiments for the ACC server 118 to skip the verification step (i.e., no user ID or password needed) by virtue of the technical support person now accessing the ACC server 118 from a trusted source, namely, the designated virtual desktop 114. In some embodiments, the technical support person may retrieve information from the ACC server 118 at this time concerning the incident for which he/she has been assigned, such as the name of the production, development, and/or test system 118 involved in the incident, the status of the incident, and the like. If there are multiple incidents assigned to the technical support person, then information pertaining to all of the incidents may be retrieved at this time. The technical support person may then submit to the ACC server 118 a request to access the production, develop, and/or test system 118 for the incident to which he/she has been assigned along with a reference for the incident (e.g., incident ticket number).

At 1118, upon seeing that a request to access a production, development, and/or test system 118 has been submitted to the ACC server 118 from the technical support person, the ACC manager may grant approval for the access if he/she deems the access to be appropriate. In some embodiments, the ACC manager may also select a set of access credentials to be used with the approved production, development, and/or test system 118 at this time.

However, in some embodiments, after the ACC manager provides approval for the access, the ACC server 118 may automatically retrieves any access credentials (e.g., user IDs, passwords, etc.) needed for the approved production, development, and/or test system 118 from the ACC database 110, indicated at 1120. As discussed above, in some embodiments, a group of user IDs, passwords, and other credentials may be reserved or otherwise set aside for use with specific production, development, and/or test systems 118. The ACC server 118 may also download a launch routine (see FIG. 8) to the virtual desktop 114, for example, to the main memory of the virtual desktop 114, indicated at 1122. The launch routine may then be executed by the technical support person to open a remote session with the approved production, development, and/or test system 118.

When executed by the technical support person, the launch routine may call an appropriate one of the remote access applications 504 residing on the virtual desktop 114 to open a remote session with the approved production, development, and/or test system 118, indicated at 1124. The particular remote access application 504 that is called (e.g., PuTTY for Unix-based systems, Remote Desktop for Windows-based systems, PCOMM for IBM mainframes) may depend on the specific credentials retrieved by the ACC server 118. These credentials may be provided to the launch routine in real time by the ACC server 118 when the launch routine is executed, or they may be downloaded along with the launch routine to the virtual desktop 114 beforehand. The launch routine may thereafter automatically (i.e., in the background) pass the credentials to the production, development, and/or test systems 118 via the remote access application 504 to thereby connect the virtual desktops 114 to the production, development, and/or test systems 118.

In some embodiments, instead of using the launch routine to open the remote session with the production, development, and/or test system 118, the technical support person may be allowed to manually open the remote session. In that case, the ACC server 118 may send the credentials to the virtual desktop 114 of the technical support person along with a reference for the approved production, development, and/or test system 118, such as a destination name, IP address, or similar navigation mechanism. The technical support person may then use this information to manually launch the remote access application 504, establish a connection with the production, development, and/or test system 118, and manually enter any credentials needed.

In still other embodiments, instead of establishing a connection from the virtual desktop 114 to the production, development, and/or test system 118, a connection may be established from the virtual desktop 114 to the jump server 130 (see FIG. 1). The jump server 130, as understood by those having ordinary skill in the art, functions as a proxy that provides another layer of security between the technical support person and the production, development, and/or test system 118. The technical support person may thereafter access the production, development, and/or test system 118 through the jump server 130, indicated at 1126.

Once the technical support person has resolved the incident, he/she may close the connection or check in the production, development, and/or test system 118. The ACC manager may thereafter revoke approval for any access given to the technical support person on the ACC server 118 at this time (or at anytime throughout the process) to prevent its further usage. Similarly, the ACC manager may cause the user ID being used for the production, development, and/or test system 118 to be revoked at this time (or at anytime throughout the process) to prevent its further usage.

Figures 12, 13:
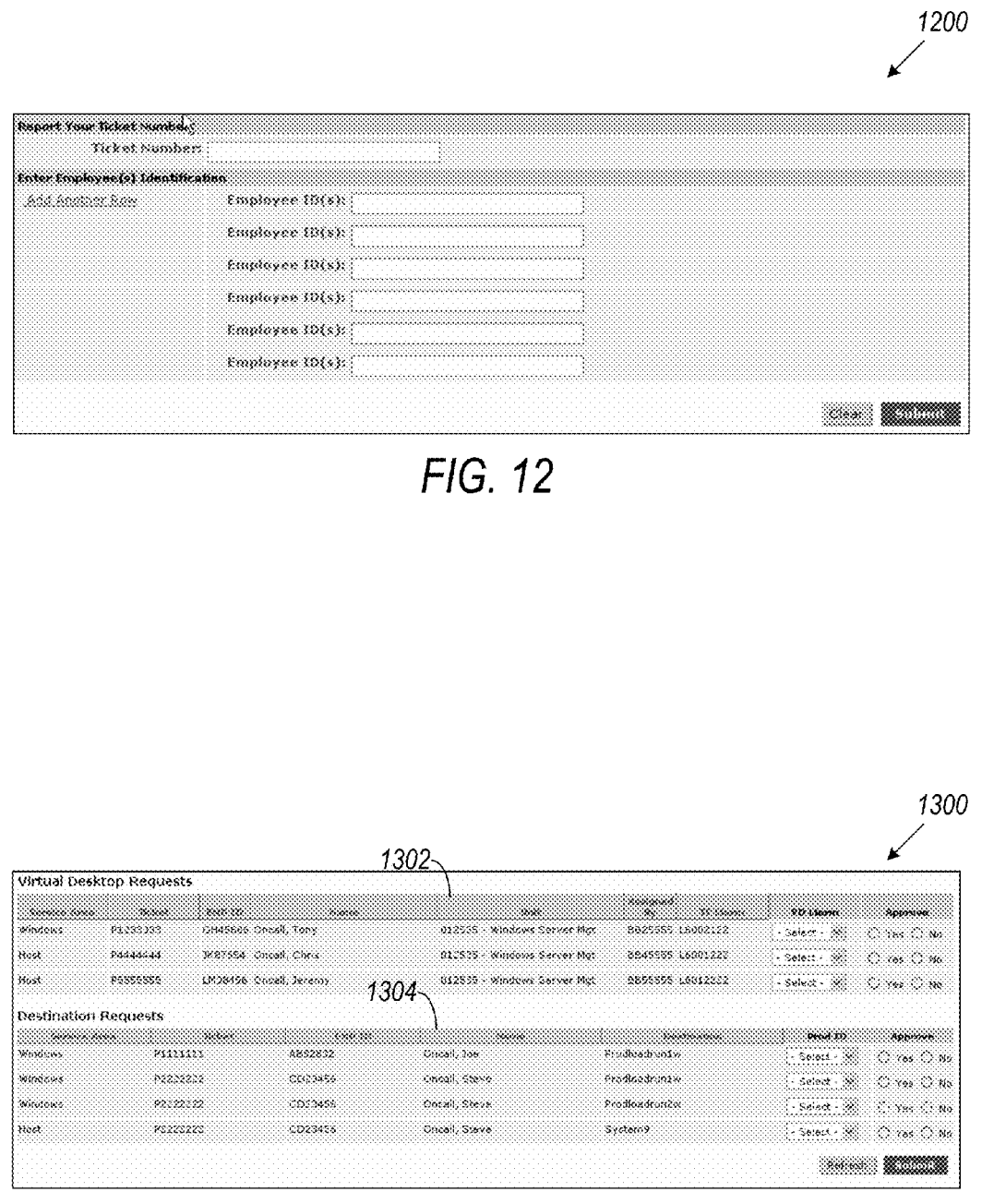

FIGS. 12-20 illustrate an exemplary implementation of the foregoing embodiments in the form of a series of graphical user interface screens. For example, FIG. 12 illustrates an exemplary incident assignment screen 1200 that may be presented by the ACC application 620 (via the ACC application server 118) to an incident manager. The incident manager may then use the incident assignment screen 1200 to create a record for a given incident on the ACC application server 118. For example, the incident manager may use the incident assignment screen 1202 to enter a ticket number of the incident and assign one or more technical personnel to the incident.

FIG. 13 illustrates an exemplary pending requests screen 1300 that may be presented by the ACC application 620 (via the ACC application server 118) to an ACC manager to notify him/her of currently-pending requests. The pending requests screen 1300 shown here may include a virtual desktop requests section 1302 and a destination request section 1304 (which lists the production, development, and test systems 128 currently being requested). The ACC manager may then use the pending request screen 1300 to select and approve a virtual desktop as well as approve a production, development, and test system 128 (i.e., a "destination") and select an access credential for that system. Starting from the left-hand side of the virtual desktop request section 1302, for a given incident, information displayed may include the service area, ticket number, user or employee ID and name of the technical support person assigned, unit or department to which the technical support person belongs, user or employee ID of the incident manager who assigned the incident, and name of the thin client (TC) terminal being used by the technical support person. The ACC manager may then select a virtual desktop (VD) terminal (e.g., via a drop-down list) and indicate approval for the technical support person to use the virtual desktop terminal. Similar information may be displayed for the destination request section 1304 along with the destination being requested. The ACC manager may then select an access credential, such as a "Prod ID" (e.g., via a drop-down list), for the destination and indicate his/her approval for the technical support person to access the destination.

Figure 14:
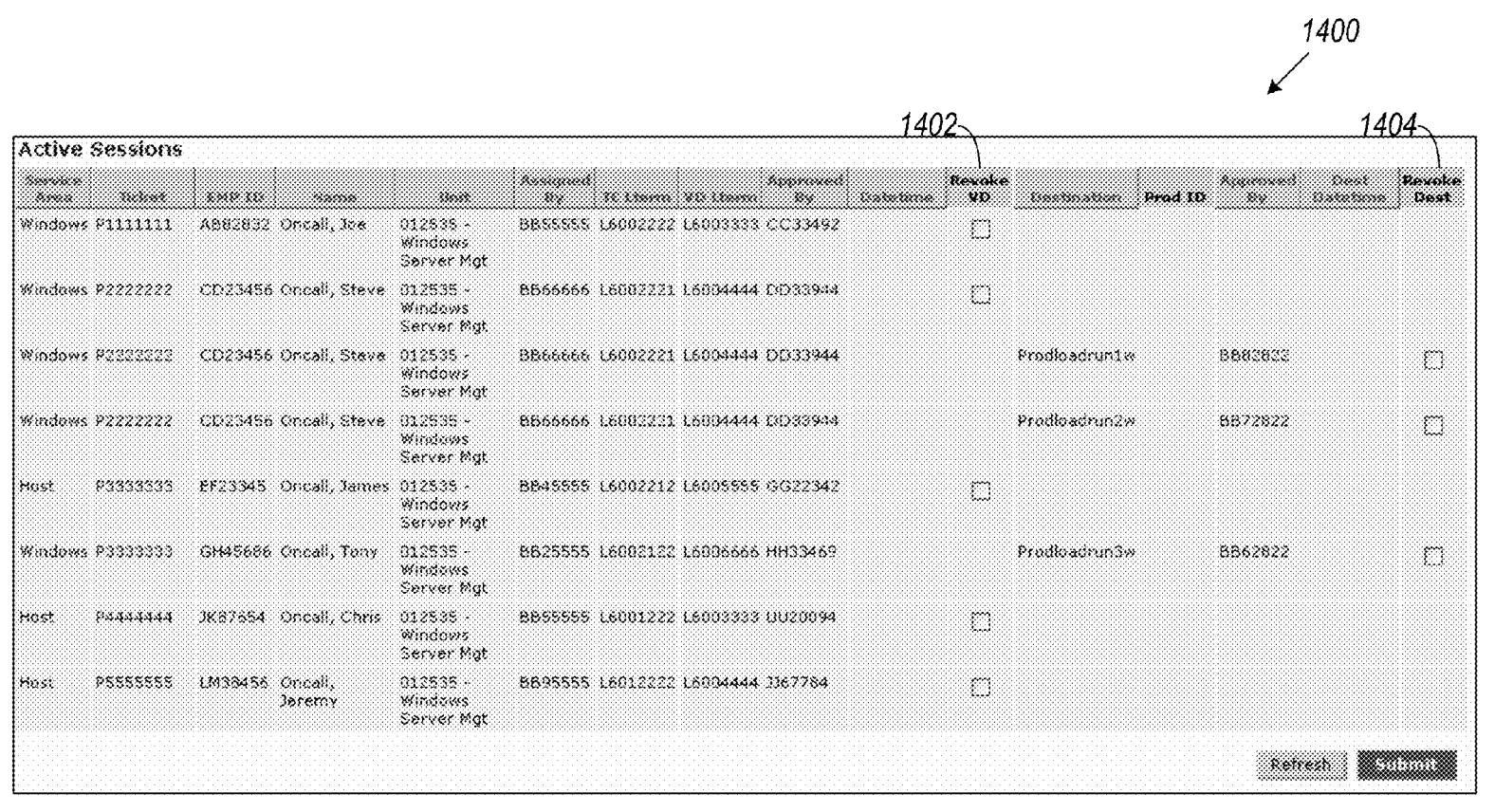

FIG. 14 illustrates an exemplary active sessions screen 1400 that may be presented to the ACC manager to inform him/her of currently pending incidence. For a given incident, the information displayed in this screen may be similar to the information displayed in the pending request screen 1300 (see FIG. 13). In addition, the active sessions screen 1400 may further include an option for the ACC manager to revoke at any given time a technical support person's approval to access a virtual desktop terminal (indicated at 1402) and/or a destination (indicated at 1404) by marking the appropriate option. Once approval has been revoked, the technical support person may no longer have access to the revoked virtual desktop terminal and/or destination.

Figure 15:
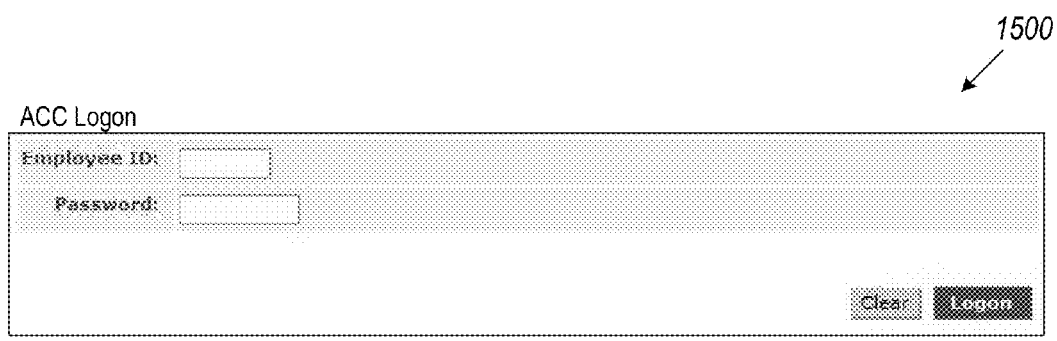
FIG. 15 illustrates an exemplary ACC logon screen according to the disclosed embodiments.

FIG. 15 illustrates an exemplary ACC logon screen 1500 that a technical support person may use to initially logon to the ACC application 620 from his/her thin client terminal 108. From this screen, the technical support person may log on to the ACC application 620 by entering his/her user or employee ID and password. The ACC application 620 may then verify the technical support person by checking his/her user or employee ID and password against information in the authentication server 126 in the manner described previously.

Figure 16:
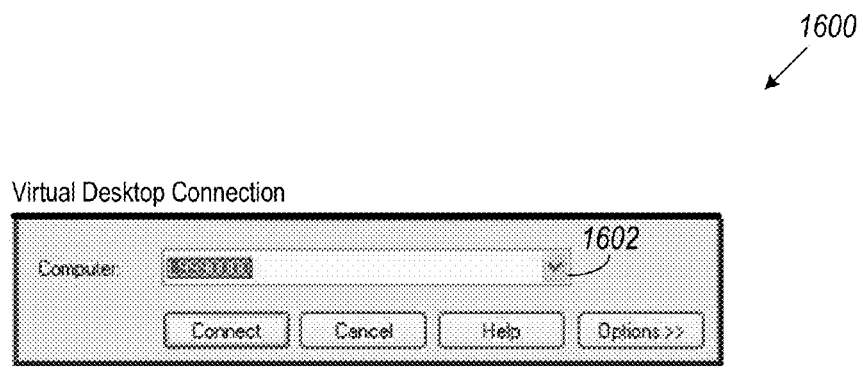
FIG. 16 illustrates an exemplary remote access screen according to the disclosed embodiments.
Figure 17:
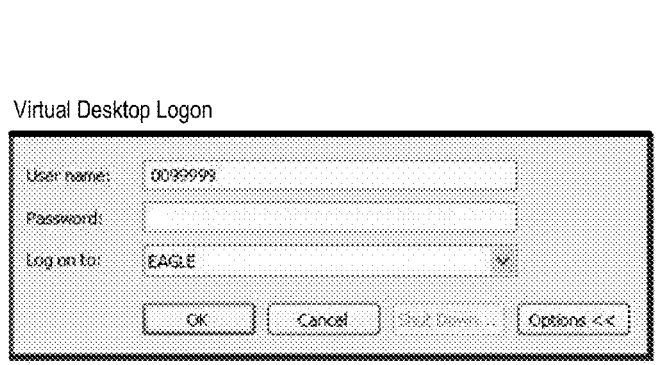
FIG. 17 illustrates an exemplary virtual desktop logon screen according to the disclosed embodiments.

Once the technical support person has been verified, the ACC application 620 may present him/her with a remote access screen 1600, as shown in FIG. 16, that allows the technical support person to connect to a virtual desktop terminal. In some embodiments, the remote access screen 1600 may be a Remote Desktop Connection screen provided by Microsoft's Remote Desktop application. Such a remote access screen 1600 may include a computer field 1602, which may be a drop-down list, that displays the various virtual desktop terminals to which the technical support person has been approved. In some embodiments, the computer field 1602 may be prefilled with the name of a particular virtual desktop terminal, such as the first one in the list or the one selected by the ACC manager for the technical support person. The technical support person may then click on a Connect button to connect to that virtual desktop terminal, or he/she may override the prefilled selection by choosing another virtual desktop terminal from the list.

FIG. 1700 illustrates a virtual desktop logon screen 1700 that may be presented to the technical support person after a connection to the virtual desktop terminal has been established. The virtual desktop logon screen 1700 may allow the technical support person to log on to the virtual desktop terminal by entering his/her user or employee ID and password. Once the technical support person has successfully logged on to the virtual desktop terminal, he/she may access the ACC application 620, for example, by entering the URL of the ACC application 620 into a Web browser on the virtual desktop terminal. In some embodiments, the technical support person may also be required to log back on to the ACC application 620 at this point. In other embodiments, a hyperlink or other navigation mechanism may be provided on the virtual desktop terminal that the technical support person may use to log back on to the ACC application 620.

Figure 18:
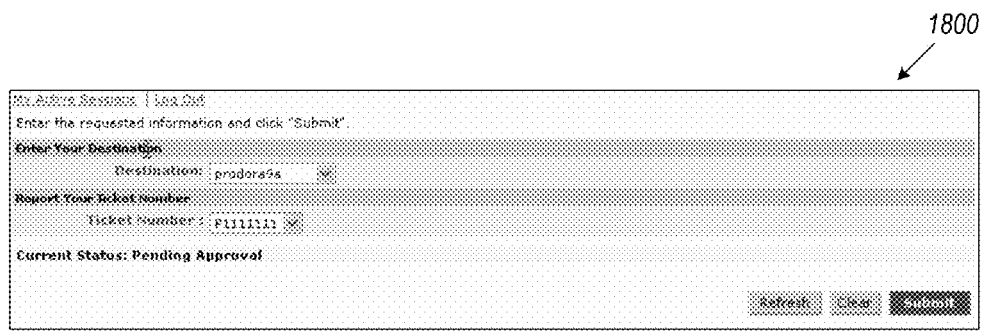
FIG. 18 illustrates an exemplary destination request screen according to the disclosed embodiments.
Figures 19, 20:
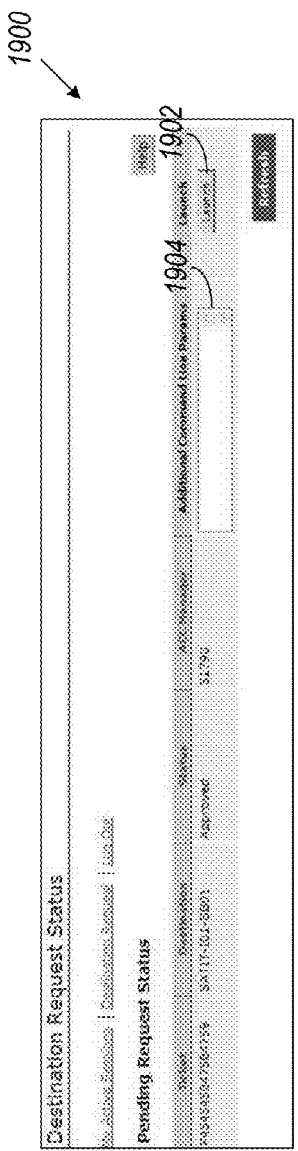
FIG. 19 illustrates an exemplary destination request status screen according to the disclosed embodiments.
FIG. 20 illustrates an exemplary active sessions screen according to the disclosed embodiments.

Having accessed the ACC application 620 from the virtual desktop terminal, the technical support person may now request a connection to one or more destinations via a destination request screen 1800, as shown in FIG. 18. The destination request screen 1800 may include destination field, which may be a drop-down list of available destinations that the technical support person may select, as well as a ticket number field, which may also be a drop-down list of available incident ticket numbers that the technical support person may select. Clicking on a Submit button sends the selections to the ACC application 620 where they may be forwarded to an ACC manager for approval. The FIG. 19 illustrates an exemplary destination request status screen 1900 that may be provided to the virtual desktop terminal of the technical support person from the ACC application 620 to allow the technical support person to view the status of his/her pending requests. Such a destination request status screen 1900 may include, for a given incident, the ticket number of the incident, destination requested, status of the request (e.g., approved, pending, etc.), and user or employee ID of the ACC manager. The launch routine described previously (see FIG. 8) may also be downloaded to the virtual desktop terminal at this time along with the destination request status screen 1900. The destination request status screen 1900 may also include a launch button 1902 that may be disabled until the destination request has been approved. Once the destination request has been approved, the technical support person may click on the Launch button 1902 to execute the launch routine in order to call an appropriate remote access application 520 in the manner described previously. A field 1904 allows the technical support person to enter any additional command line parameters for the remote access application 520 prior to clicking on the Launch button 1902. As mentioned above, however, it is possible in some embodiments to radically execute the launch routine as soon as approval by the ACC manager is granted (i.e., without any intervention by the technical support person.

FIG. 20 illustrates an exemplary active sessions screen 2000 that may be provided to the virtual desktop terminal of the technical support person to allow the technical support person to view the status of various incidents he/she is currently handling. The information displayed on the screen is similar to corresponding information displayed on previous screens and will not be described in detail here. In the example of FIG. 20, an expansion icon (e.g., a "+" sign, etc.) may be displayed next to certain incidents to indicate that the technical support person has accessed one or more destinations in connection with that incident (see second row, ticket number "P2222222"). Clicking on the expansion icon for an incident allows the technical support person to see which destinations he/she has accessed for that incident. A check-in option (indicated at 2002) allows the technical support person to relinquish (i.e., check in) his/her access to any virtual desktop terminals and/or destinations he/she may have been granted approval for a given incident. Selecting the check-in option 2002 for a given incident effectively closes that incident and updates the ACC application 620 accordingly.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for controlling access by technical support personnel to a company's computing device, the system comprising:
   a thin client configured to send identification information from the technical support personnel, the technical support personnel and the thin client being located in an access control center (ACC) that is physically and logically isolated from the company's computing device;
   a proxy server configured to receive communications from the thin client and forward the communications to an ACC server;
   the ACC server configured to:
   authorize the technical support personnel to request a first approval from an authentication server after the ACC server receives the identification information from the proxy server;
   request the first approval from the authentication server;
   obtain the first approval from the authentication server for the technical support personnel, the first approval authorizing the technical support personnel to request a second approval from the authentication server and to access a virtual desktop wherein the virtual desktop functions as a workstation device;
   connect the thin client to the virtual desktop in a first session;
   obtain the second approval from the authentication server for the technical support personnel after obtaining the first approval, the second approval authorizing the technical support personnel to access the company's computing device;
   the virtual desktop configured to automatically establish a remote access session for the technical support personnel from the virtual desktop to the company's computing device after obtaining the second approval wherein the virtual desktop is provided by a virtual desktop manager that provides a number of virtual desktops to a number of technical support personnel; and the company's computing device.

2. The system of claim 1, wherein the virtual desktop configured to automatically establish the remote access session is further configured to obtain access credentials for the company's computing device.

3. The system of claim 2, wherein the access credentials are automatically obtained based on the company's computing device.

4. The system of claim 2, wherein at least one access credential is manually selected for the company's computing device by an authorized person.

5. The system of claim 1, wherein the virtual desktop configured to automatically establish the remote access session is further configured to execute a launch routine that is configured to automatically establish a remote session between the technical support personnel in the company's computing device.

6. The system of claim 5, wherein the launch routine is executed automatically upon the second approval being obtained.

7. The system of claim 1, wherein the launch routine is initiated manually by the technical support personnel.

8. A method of controlling access by technical support personnel to a company's computing device, the method comprising:
   receiving identification information from the technical support personnel via a thin client at a proxy server, the technical support personnel and the thin client being located in an access control center (ACC) that is physically and logically isolated from the company's computing device;
   authorizing the technical support personnel to request a first approval from an authentication server after an ACC server receives the identification information from the proxy server;
   request the first approval from the authentication server;
   obtaining the first approval from the authentication server for the technical support personnel, the first approval authorizing the technical support personnel to request a second approval from the authentication server and to access a virtual desktop wherein the virtual desktop functions as a workstation device;
   connecting the thin client to the virtual desktop in a first session wherein the virtual desktop is provided by a virtual desktop manager that provides a number of virtual desktops to a number of technical support personnel;
   obtaining the second approval from the authentication server for the technical support personnel after obtaining the first approval, the second approval authorizing the technical support personnel to access the company's computing device; and
   automatically establishing a remote access session for the technical support personnel from the virtual desktop to the company's computing device after obtaining the second approval.

9. The method of claim 8, wherein automatically establishing a remote access session includes obtaining access credentials for the company's computing device.

10. The method of claim 9, wherein the access credentials are automatically obtained based on the company's computing device.

11. The method of claim 9, wherein at least one access credential is manually selected for the company's computing device by an authorized person.

12. The method of claim 8, wherein automatically establishing a remote access session includes executing a launch routine that is configured to automatically establish a remote session between the technical support personnel in the company's computing device.

13. The method of claim 12, wherein the launch routine is executed automatically upon the second approval being obtained.

14. The method of claim 8, wherein the launch routine is initiated manually by the technical support personnel.

15. A non-transitory computer-readable medium encoded with computer-readable instructions for controlling access by technical support personnel to a company's computing device, the computer-readable instructions comprising instructions for causing a computer to:
- receive identification information from the technical support personnel via the thin client at a proxy, the technical support personnel and the thin client being located in an access control center (ACC) that is physically and logically isolated from the company's computing device;
- authorize the technical support personnel to request a first approval from an authentication server after an ACC server receives the identification information from the proxy server;
- request the first approval from the authentication server;
- obtain the first approval from the authentication server for the technical support personnel, the first approval authorizing the technical support personnel to request a second approval from the authentication server and to access a virtual desktop wherein the virtual desktop functions as a workstation device;
- connecting the thin client to the virtual desktop in a first session wherein the virtual desktop is provided by a virtual desktop manager that provides a number of virtual desktops to a number of technical support personnel;
- obtain the second approval from the authentication server for the technical support personnel after obtaining the first approval, the second approval authorizing the technical support personnel to access the company's computing device; and
- automatically establish a remote access session for the technical support personnel from the virtual desktop to the company's computing device after obtaining the second approval.

16. The computer-readable medium of claim 15, wherein the instructions for causing a computer to automatically establish a remote access session cause the computer to obtain access credentials for the company's computing device.

17. The computer-readable medium of claim 16, wherein the access credentials are automatically obtained based on the company's computing device.

18. The computer-readable medium of claim 16, wherein at least one access credential is manually selected for the company's computing device by an authorized person.

19. The computer-readable medium of claim 15, wherein the instructions for causing a computer to automatically establish a remote access session cause the computer to execute a launch routine that is configured to automatically establish a remote session between the technical support personnel in the company's computing device.

20. The computer-readable medium of claim 19, wherein the launch routine is executed automatically upon the second approval being obtained.

21. The computer-readable medium of claim 15, wherein the launch routine is initiated.

* * * * *